US008129936B2

(12) United States Patent
Becker et al.

(10) Patent No.: US 8,129,936 B2
(45) Date of Patent: Mar. 6, 2012

(54) OPEN-LOOP AND/OR CLOSED-LOOP CONTROL SYSTEM OF A 3-PHASE POWER CONVERTER FOR THE OPERATION OF AN ASYNCHRONOUS MACHINE

(75) Inventors: Robert Becker, Ostringen (DE); Peter Krafka, Schriesheim (DE); Michael Rampe, Weinheim-Hohensachesen (DE)

(73) Assignee: Bombardier Transportation GmbH, Berlin (DE)

( * ) Notice: Subject to any disclaimer, the term of this patent is extended or adjusted under 35 U.S.C. 154(b) by 230 days.

(21) Appl. No.: 12/447,947

(22) PCT Filed: Oct. 19, 2007

(86) PCT No.: PCT/EP2007/009337
§ 371 (c)(1),
(2), (4) Date: Dec. 3, 2009

(87) PCT Pub. No.: WO2008/052714
PCT Pub. Date: May 8, 2008

(65) Prior Publication Data
US 2010/0079104 A1 Apr. 1, 2010

(30) Foreign Application Priority Data
Oct. 30, 2006 (DE) .......................... 10 2006 052 042

(51) Int. Cl.
*H02P 27/08* (2006.01)
(52) U.S. Cl. ........ 318/802; 318/801; 318/800; 318/799; 318/798; 318/767
(58) Field of Classification Search .................. 318/802, 318/801, 800, 799, 798, 767, 727
See application file for complete search history.

(56) References Cited

U.S. PATENT DOCUMENTS 4,926,105 A * 5/1990 Mischenko et al. .......... 318/800
(Continued)

FOREIGN PATENT DOCUMENTS

DE 4110225 A1 10/1992
(Continued)

OTHER PUBLICATIONS

Tripathi et al. "Dynamic torque control performance of the Direct Flux Control scheme in field weakening range", 2003, pp. 220-225.

(Continued)

*Primary Examiner* — Walter Benson
*Assistant Examiner* — David Luo
(74) *Attorney, Agent, or Firm* — The Webb Law Firm

(57) ABSTRACT

An open-loop and/or closed-loop control device for operating an asynchronous machine which is fed by a 3-phase power converter. The open-loop and/or closed-loop control structure has a stator flux controller and a pulse pattern generator for generating pulse signals based on mean values. An output of the stator flux controller is connected to an input of the pulse pattern generator, with the result that the pulse pattern generator can generate the pulse signals as a function of a manipulated variable which is generated by the stator flux controller. The stator flux controller is configured so as to generate the manipulated variable as a function of a desired value of the stator flux of the asynchronous machine and as a function of a desired value of the torque of the asynchronous machine. The stator flux controller has a dead-beat control response.

26 Claims, 15 Drawing Sheets

U.S. PATENT DOCUMENTS

| | | | | |
|---|---|---|---|---|
| 5,644,205 | A | * | 7/1997 | Phuoc et al. ........... 318/801 |
| 2008/0136380 | A1 | | 6/2008 | Hoffmann et al. |

FOREIGN PATENT DOCUMENTS

| | | |
|---|---|---|
| EP | 0945956 A2 | 9/1999 |
| EP | 0945970 A2 | 9/1999 |
| WO | 2005018086 A1 | 2/2005 |

OTHER PUBLICATIONS

Amler, et al. "Highly dynamic and speed sensorless control of traction drives", 2003, pp. 1-10.

Lee et al., "A Dead-Beat Type Digital Controller for the Direct Torque Control of an Induction Motor", Transactions on Power Electronics, vol. 17, No. 5, Sep. 2002, pp. 739-746.

Worner, "Quasi-synchrone statorflussgefuhrte Pulsverfahren fur die wechselrichtergespeiste Induktionsmaschine [Quasi-synchronous stator-flux guided pulse control methods for the induction machine operated by a power converter]", 2001 Dissertation, VDI-Fortschrittsberichte, Series 21, No. 302.

Evers, et al. "Flux-guided control strategy for pulse pattern changes without transients of torque and current for high power IGBT-Inverter drives", 2001, pp. 1-10.

Lascu et al. "A Modified Direct Torque Control for Induction Motor Sensorless Drive", Transactions on Industry Applications, vol. 36, No. 1, Jan.-Feb. 2000, pp. 122-130.

Griva et al. "Wide Speed Range DTC Drive Performance with New Flux Weakening Control", 1998, pp. 1599-1604.

Richter "Analyse and Bewertung von Steuerverfahren fur pulsumrichtergespeiste Asynchronmaschinen [Analysis and evaluation of control methods for pulse converter fed asynchronous machines]", 1996 Dissertation, VDI-Fortschrittsberichte, Series 21, No. 207.

Aaltonen et al. "Direkte Drehmomentregelung von Drehstromantrieben [Direct closed-loop torque control of three-phase drives]", ABB Technik, 1995, pp. 19-24.

Horstmann et al. "Die stromrichternahe Antriebsregelung des Steuergerates fur Bahnautomatisierungssysteme SIBAS 32 [Closed-loop drive control via the power converter of the control unit for SIBAS 32 railway automation systems]", 1992, pp. 344-350.

Janecke et al. "Direkte Selbstregelung, ein neuartiges Regelverfahren fur Traktionsantriebe im Ersteinsatz bei dieselelekrtischen Lokomotiven [Direct automatic control, an innovative control method for traction drives used for the first time in Diesel-electric locomotives]", 1991, pp. 79-87.

Thogersen et al. "Stator Flux Oriented Asynchronous Vector", 1990, pp. 641-648.

Depenbrock "Direkte Selbstregelung (DSR) fur hochdynamische Drehfeldantriebe mit Stromrichterspeisung [Direct automatic control (DSR) for highly dynamic rotating field drives with power converter feed]", 1985, pp. 211-218.

* cited by examiner

| Name | VSI Output Voltage | Stator flux-Trajectory | Zero-Voltages per Period |
|---|---|---|---|
| EP3 | | | 0 |
| EP5 | | | 6 |
| EP7 | | | 12 |
| EP9 | | | 18 |

Fig.3

| Name | VSI Output Voltage | Stator flux-Trajectory | Zero-voltages per Period |
|------|--------------------|-----------------------|--------------------------|
| SP1  |                    |                       | 0                        |
| CP3  |                    |                       | 6                        |
| CP5  |                    |                       | 12                       |
| CP7  |                    |                       | 18                       |

Fig.4

OPEN-LOOP AND/OR CLOSED-LOOP CONTROL SYSTEM OF A 3-PHASE POWER CONVERTER FOR THE OPERATION OF AN ASYNCHRONOUS MACHINE

BACKGROUND OF THE INVENTION

1. Field of the Invention

This invention relates to an open-loop and/or closed-loop control device for a 3-phase power converter for operating an asynchronous machine. The invention further relates to a corresponding open-loop and/or closed-loop control method. In particular, the invention relates to the controlled and/or regulated impression of a torque reference value and a stator flux reference value for a converter-operated three-phase asynchronous machine. The invention is intended in particular for use in heavy-duty applications such as, for example, traction power converters for the supply of power to propulsion motors of railway vehicles.

2. Description of the Related Art

One characteristic of such propulsion systems is the use of three-phase asynchronous machines in connection with three-phase pulse-controlled converters and impressed intermediate current voltage. These propulsion systems, on account of the required high power density and required efficiency, are operated at a relatively low operating frequency. For example, the operating frequency in the voltage operating range is only in the range of 300 Hz to 800 Hz on locomotives for main-line trains, railcars, motor sets and heavy-rail commuter trains. In light-rail commuter trains, the operating frequency typically lies in the range of 800 Hz to 3 kHz. The available intermediate circuit voltage must be utilized optimally, i.e. the open-loop and/or closed-loop control structure must make possible operation in the field weakening range without any operating voltage reserve. To avoid unacceptable system perturbations, it is also necessary to generate a defined and controllable steady-state harmonic spectrum. Together with the relatively low operating frequency and maximum output voltage of the power converter, this requires the use of synchronous pulse control methods.

The requirements for the control response of traction units powered by current converters are also relatively demanding. Normally, on a propulsion system in the lower and intermediate power range, power converters with a relatively high operating frequency (5 kHz to 20 kHz) are used in connection with a conventional field-oriented control method to meet control requirements of this type.

For traction applications, in particular for direct operation on a direct-current trolley line without an input controller, it is important to have a good disturbance reaction of the closed-loop control system to sudden changes in the trolley line voltage. The control of skidding and slipping actions as well as the attenuation of mechanical propulsion vibrations and stable operation require an effective and highly dynamic control response of the indirect torque impression compared to steady-state drives of the same power class.

The closed-loop and/or open-loop control method for the protection of the power converter and/or of the motor must also guarantee a predictable maximum current load and securely prevent the commutation failure of the connected three-phase asynchronous machine as well as individual machines within a group drive. This requirement also applies in particular when there are variations in the disturbance and reference variables for the reasons described above.

The prior art describes methods that are used in particular under the boundary conditions indicated above. One feature common to the methods of the prior art is the division of the individual open-loop and/or closed-loop control method into the essential functions: measured data acquisition, flux model, control structure and trigger equipment (for the pulse generation), whereby a distinction is made in particular between the closed-loop control structure and the open-loop control equipment for the individual methods listed above. Some or all of the above mentioned functions are conventionally realized inside a signal processor system and to some extent with direct FPGA (Field Programmable Gate Array) support.

In general, the following analog measured variables are measured for the closed-loop drive control systems described above:

At least two of the three power converter phase currents (machine current or sum of the individual machine currents in group drives with machines connected in parallel) and The intermediate circuit voltage of the pulse-controlled converter.

In one possible variant, two phase voltages of the power converter output can also be measured.

Optionally, the individual motor temperatures can also be measured and used for, among other things, the tracking of the resistance parameters of the machines as a function of the temperature.

The motor speed can also be measured as an additional measured variable.

If one power converter feeds two or more traction motors which are connected in parallel, the individual motor speeds are preferably acquired individually and the arithmetic average, for example, can be used for the closed-loop control.

The basis for the field-oriented closed-loop control methods of the prior art is the knowledge of the magnitude and the angular position of the rotor flux in rotor-flux oriented methods and/or of the stator flux in stator-flux based methods. But because the flux linkages and the torque of the machine cannot be measured directly, mathematical models (flux models) which simulate the internal structure of the asynchronous machine are generally used.

A flux model can be used in particular for the determination of the flux from the measured values or from values simulated by means of suitable calculation processes for the machine terminal voltage, machine phase current and speed. Conventionally, the flux model is composed of two known sub-models of the asynchronous machine, namely the voltage model and the current model. At lower speeds, the influence of the current model predominates, while at higher speeds, on the other hand, the influence of the voltage model is predominant. The combination of the two sub-models combines their advantages and can be interpreted as a voltage model guided by the current model.

The method described in Stanke, G., Horstmann, D.: "Die stromrichternahe Antriebsregelung des Steuergerätes für Bahnautomatisierungssysteme SIBAS32" [Closed-loop drive control via the power converter of the control unit for SIBAS32 railway automation systems], eb-Elektrische Bahnen, Volume 90 (1992), No. 11, pp. 344-350, is a rotor-flux-oriented control method based on mean values with asynchronous and synchronous pulses for the actuation of the power converter. Along with the advantages of, among other things, the synchronous pulses and of the indirect two-component current control system (see above), this method has disadvantages in terms of the achievable control response and disturbance response, in particular in response to variations in the intermediate circuit voltage.

The DSR method described in Depenbrock, M.: "Direkte Selbstregelung (DSR) für hochdynamische Drehfeldantriebe mit Stromrichterspeisung" [Direct automatic control (DSR) for highly dynamic rotating field drives with power converter feed], etzArchiv, Vol. 7 (1985) No. 7, pp. 211-218 and in Jänecke, M., Kremer, R., Steuerwald, G.: "Direkte Selbstregelung, ein neuartiges Regelverfahren für Traktionsantriebe im Ersteinsatz bei dieselelektrischen Lokomotiven" [Direct automatic control, an innovative control method for traction drives used for the first time in Diesel-electric locomotives], eb-Elektrische Bahnen, Vol. 89 (1991), No. 3, pp. 79-87 is a method based on instantaneous values which is particularly well suited for traction drives and has an optimal dynamic response, among other things, although it does not have a reproducible steady-state response. The DSR direct automatic control system also allows only very small ratios of the operating frequency to the fundamental frequency. Among other things, moreover, on account of the minimum operating period of the power converter, operation at low speeds is problematic, a problem that can be solved by switching to an alternative, likewise stator-flux based control method called ISR (indirect automatic control) (see the above referenced publication by Jänecke, M. et al.).

The DTC method which is described in "Direkte Drehmomentregelung von Drehstromantrieben" [Direct closed-loop torque control of three-phase drives], ABB Technik, No. 3, (1995), pp. 19-24, is a method based on instantaneous values which offers an optimal dynamic response, like the DSR automatic control method. However, the steady-state response is likewise not reproducible, and this direct torque control system also does not permit very small ratios of operating frequency to fundamental frequency. In contrast to the DSR, in the DTC method, the stator flux trajectory follows a circular path which, among other things, requires a significantly higher operating frequency of the power converter.

In the methods described in WO 2005/018086 A1, in Amler, G.; Hoffmann, F.; Stanke, G.; Sperr, F.; Weidauer, M.: "Highly dynamic and speed sensorless control of traction drives", Proc. EPE Conference 2003, Toulouse, in Evers, C.; Hoffmann, F.; Steimel, A.; Wörner, K.: "Flux-guided control strategy for pulse pattern changes without transients of torque and current for high power IGBT-converter drives", Proc. EPE Conference 2001, Graz and in Wörner, K.: "Quasi-synchrone statorflussgeführte Pulsverfahren für die wechselrichtergespeiste Induktionsmaschine" [Quasi-synchronous stator-flux guided pulse control methods for the induction machine operated by a power converter], Dissertation 2001, VDI-Fortschrittsberichte, Series 21, No. 302, the disadvantages described above such as a poor control response and poor disturbance response at relatively low operating frequencies of the mean-value based control processes with a downstream pulse pattern generator are eliminated by a stator-flux guided pulse generation based on instantaneous values.

D1 (G. Griva et al.) describes a field weakening method for induction motors, whereby a DTC (Direct Torque Control) system is used. In the DTC system, the stator flux and the torque are controlled. Switching pulses for the power converter switch are received via the space vector PWM method. According to D1, the torque and the stator flux are dead-beat controlled.

D2 (Tripathi et al.) describes the dynamic and stationary response of a torque control system in the field weakening range for a DFC (Direct Flux Control) method which uses a stator-flux vector based space vector modulation. In this method, a reference value for the stator frequency is prepared in an external loop as the result of a combination of the output variable of a torque controller and a measured value for an internal loop. The internal loop has a predictive stator flux control with a dead-beat response and a space vector modulation based on a stator flux error vector.

D3 (Lee et al.) describes the introduction of a dead-beat control method for a conventional direct torque control system. Prior art publication D3 does not describe a closed-loop control structure.

SUMMARY OF THE INVENTION

It is an object of this invention to describe an open-loop and/or closed-loop control structure of the type described above for a 3-phase power converter which makes possible a pulse pattern generation based on mean values for the actuation of the power converter, whereby the above mentioned high dynamic requirements, in particular for traction applications on railway vehicles, can be met with optimal utilization of the available input voltage of the power converter. It must also be possible to generate a steady-state, defined and controlled harmonic spectrum even at low operating frequencies.

It is an additional object of this invention to describe an open-loop and/or closed-loop control system which makes possible an open-loop and/or closed-loop structure which is as uniform as possible and a pulse pattern based on mean values as well as a pulse pattern based on instantaneous-values for the actuation of a power converter.

It is an additional object of this invention to describe corresponding open-loop and/or closed-loop control methods for the operation of an asynchronous machine which is operated with a 3-phase power converter.

The invention teaches an open-loop and/or closed loop device with an open-loop and/or closed loop structure which has a stator flux controller and has a pulse pattern generator at least for the generation of pulse signals based on mean values. The stator flux controller generates the pulse signals as a function of an input variable which is generated in particular by an upstream slip frequency controller, and as a function of additional input signals. The stator flux controller of the pulse pattern generator is designed to generate the manipulated variable as a function of a reference value of the stator flux of the asynchronous machine and as a function of a reference value of the torque of the asynchronous machine. The invention teaches that the stator flux controller has a dead-beat control response.

The invention further teaches that the open-loop and/or closed-loop control device has an open-loop and/or closed-loop control structure which includes a slip frequency controller and a pulse pattern generator with inherent stator flux control for the generation of pulse signals based on mean values and instantaneous values. The pulse signals based on mean values and instantaneous values are generated optionally and as a function of the current operating conditions. The term "pulse pattern generator" as used in this application therefore means a total pulse pattern generator, e.g. one that can have individual pulse pattern generators, each of which generates the pulse signals based on mean values and instantaneous values. One output of the slip frequency controller is in communication with one input of the overall pulse pattern generator, so that the pulse pattern generator can generate the pulse signals as a function of a manipulated variable which is generated by the slip frequency controller as well as additional input signals. The stator flux controller is realized in particular as described above.

A controller with a dead-beat response means in particular a controller (such as a p-controller, i.e. a controller with a proportional component) which takes into consideration a difference between a reference value of the control variable and a measured value of the control variable in the calculation of the manipulated variable. As in a p-controller, therefore, a comparison between the reference value and the measured value is performed. In contrast to the conventional p-controller, the controller with a dead-beat response, however, does not have an adjustable controller gain. An equation which describes the control response of a p-controller and which has a difference between the reference value and the measured value multiplied by the (adjustable) controller gain can consequently be transformed, for example, into an equation which describes the control response of a dead-beat controller in which the controller gain is set to a constant, non-adjustable value. As will be shown in the description of the accompanying figures (FIG. 9 in particular), for the calculation of the output variable of a controller with a dead-beat response, the difference between the reference value and the measured value can be multiplied by a factor or by factors which are a function of the instantaneous operating state and/or are a function of an expected variable. However, a factor of this type is not controller gain as the term is used in control engineering.

The invention is based on the knowledge that there can be a partial loss of control capability in the range of the pulses that are based on mean values in the event of sudden variations in the intermediate circuit voltage and/or the speed with the use of a conventional control structure with a p-controller for the stator flux control (and optionally an additional synchronization controller to guarantee synchronization for synchronous pulses based on mean values). That is the case in particular if a sudden variation of this type occurs during operation in the field weakening range. With state discrepancy alarms of this type, the field weakening coefficients used for the closed-loop control and the ratio of the amount of the reference value of the stator voltage space vector to the maximum possible output voltage of the power converter are not the same. The pulse pattern generator for the generation of the pulse signals based on mean values, at least with pulse patterns without zero voltages, is then not capable of setting the specified output voltage required by the controller at the output of the power converter.

Other controllers of the structure, such as a slip frequency controller, for example, and a synchronization controller for the synchronization of switching actions with the fundamental frequency of rotation of the stator flux space vector, will likewise attempt to compensate for the disturbance. Because the pulse pattern generator cannot achieve the response required by the p-controller, however, overall unstable and non-reproducible conditions occur in the structure. The result may be a cutoff of the power converter and the entry of a disturbance in a fault memory.

On the other hand, a stator flux controller with a dead-beat response will react to a sudden change of a reference variable and/or a disturbance with the greatest possible variation of the manipulated variable calculated by it. The controller "prioritizes" the setting of the stator flux. The greatest possible approximation to the new operating situation caused by the sudden change is thereby possible, i.e. to an elevated intermediate circuit voltage. Depending on the operating state before the occurrence of the sudden change, the compensation for the sudden change can even be completely carried out in a single control cycle (which is also called a dead-beat response), i.e. the control continues to work immediately thereafter as if the sudden change had not occurred. However, if the sudden change cannot be corrected in a single control cycle, the maximum possible approximation to the new operating conditions at least has the advantage that instabilities in the control response can be largely avoided.

A compensation for sudden changes in reference variables and/or disturbances is not possible in a single control cycle, for example when, even on the assumption that the sudden change can be compensated for in a single control cycle, the power converter is operated both before and after the sudden change in the field weakening range without an operating voltage reserve.

For this reason in particular, and the resulting achievable maximum possible structural uniformity for pulses based optionally on mean values or instantaneous values, it is preferable that the structure, apart from the stator flux controller with the dead-beat response and a slip frequency controller upstream of the stator flux controller, has no synchronization controller which synchronizes the switching from zero voltages of the power converter with the fundamental frequency of rotation of the stator flux space vector. Rather the combination of the stator flux controller and upstream slip frequency controller takes over the function of such a synchronization controller. A greater stability of the structure is thereby achieved, because a smaller number of controllers are involved. In both of the configurations described above (based on mean values and/or instantaneous values), the synchronization occurs via the measured stator flux trajectory. This uniformity of synchronization simplifies the changeover between the operation of the power converter by means of pulses based on mean values and instantaneous values.

The structure claimed by the invention can be used both for the synchronous and asynchronous operation of the power converter based on mean values.

An additional advantage of this invention is related to the features described above. As a result of:
- the stator flux controller with the dead-beat response claimed by the invention,
- the related possibility of giving priority to the synchronization based on the measured stator flux trajectory without the need to use an additional synchronization controller,
- the second pulse pattern generator for the generation of pulse patterns guided by the actual stator flux trajectory and based on instantaneous values with the same type of synchronization and
- the structuring of the device, in which other units of the device are operated independently of the currently selected pulse pattern type, a structure that is as uniform as possible for different types of pulse patterns is achieved. A significant advantage of a uniform structure is its relatively low complexity. An additional advantage is that large parts of the total structure can be tested and put in operation independently of the pulse pattern.

BRIEF DESCRIPTION OF THE DRAWINGS

Units which are operated in particular independently of the type of pulse pattern include, for example, a unit (power converter model) for the modeling of the response of the power converter, a unit (stator flux observer) for the estimation of the variables stator flux, rotor flux and air gap torque of the connected asynchronous machine which cannot be measured directly, and for the output of the corresponding information to the currently active pulse pattern generator, whereby the flux observer can optionally also or alternatively calculate and output an estimated value for the rotor speed of the machine, a unit for the calculation of the magnetization voltage and modulation and/or a unit (see, for example, EP 0

945 970 A2) for the correction of the fault voltage of the power converter, which is downstream of the pulse pattern generator.

Figure 1:
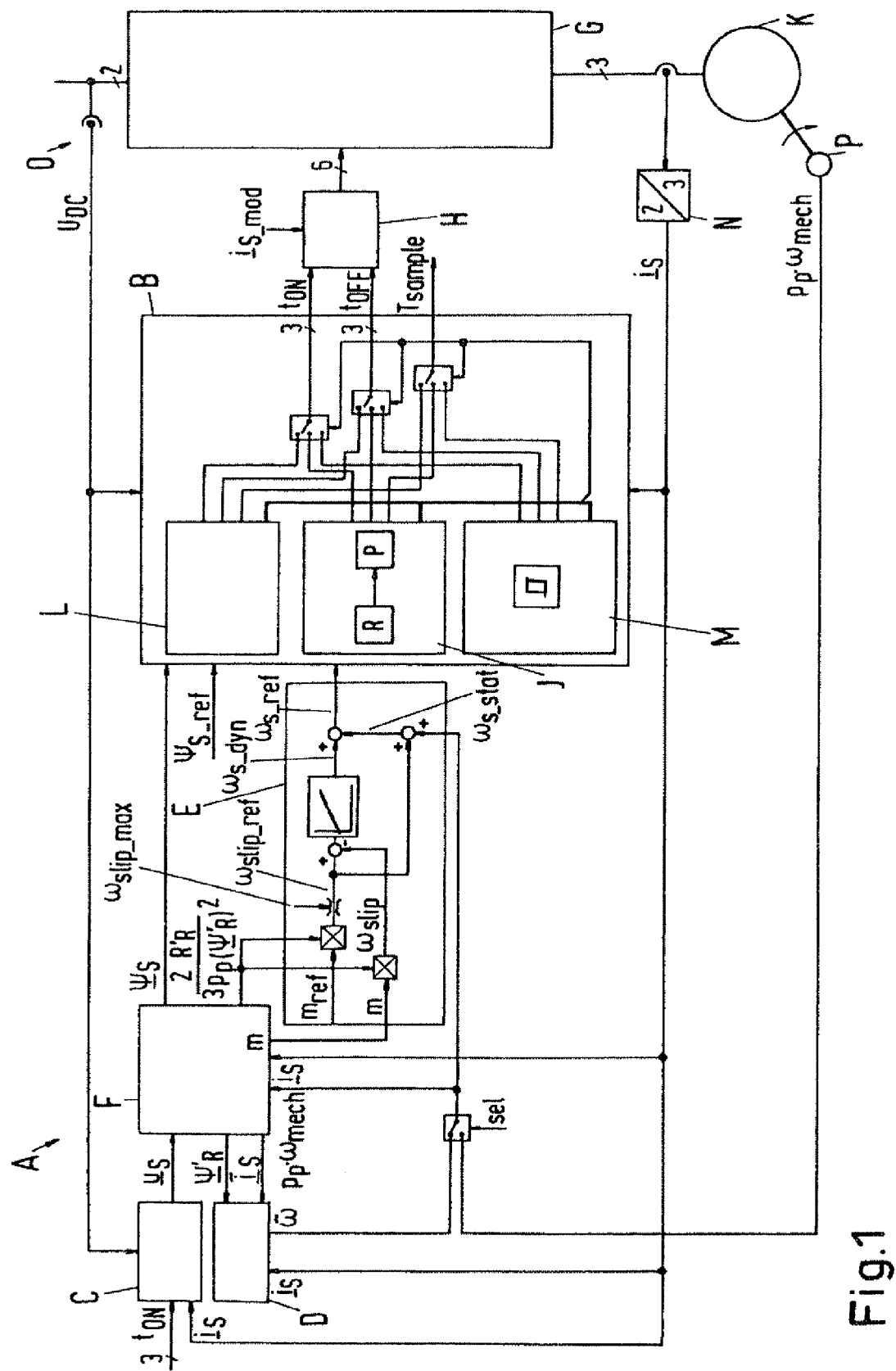

The uniform structure makes it possible to control highly dynamic system excitations caused by disturbances (in particular variations of the intermediate circuit voltage and/or speed), in particular for pulses with a low number of clock pulses or in block operation as well as by dynamically switched zero voltages. "Dynamically switched zero voltages" means zero voltages that are switched in addition to any regular zero voltages (e.g. synchronous zero voltages) that may be present, to make possible a quick reaction to the disturbance. On account of the control structure claimed by the invention and on account of a control of the sampling of measured variables described below, the changeover can be made without any significant delay, e.g. from pulses in low clock pulse timing, specifically block timing (SP1), EP3, CP3, EP5 and CP5 (for an explanation of these abbreviations, see the description of the accompanying figures), depending on the type of stator flux trajectory (hexagon, or hexagon with collapsed corners) to a corresponding configuration of the DSR for the period of the direct disturbance. A negative influence of any synchronous zero voltages that may be present and the dynamically switched zero voltages is therefore automatically eliminated. Because the stator flux trajectories have the same shape and amplitude, after the completion of the transient reaction, the system can be easily switched over to the new operating point, e.g. into the original synchronous pulse mode.

In practical applications, there are also units for filtering, in particular for the filtering of vectoral variables (such as the measured stator currents). The filtering is preferably done in field coordinates, whereby on account of the control structure claimed by the invention the variables can be advantageously used for different tasks. To be able to filter the variables into field coordinates, they are transformed into a coordinate system that rotates with the stator or rotor flux. Filter parameters (such as filter corner frequencies) can be adapted to the respective pulse pattern.

Figure 2:
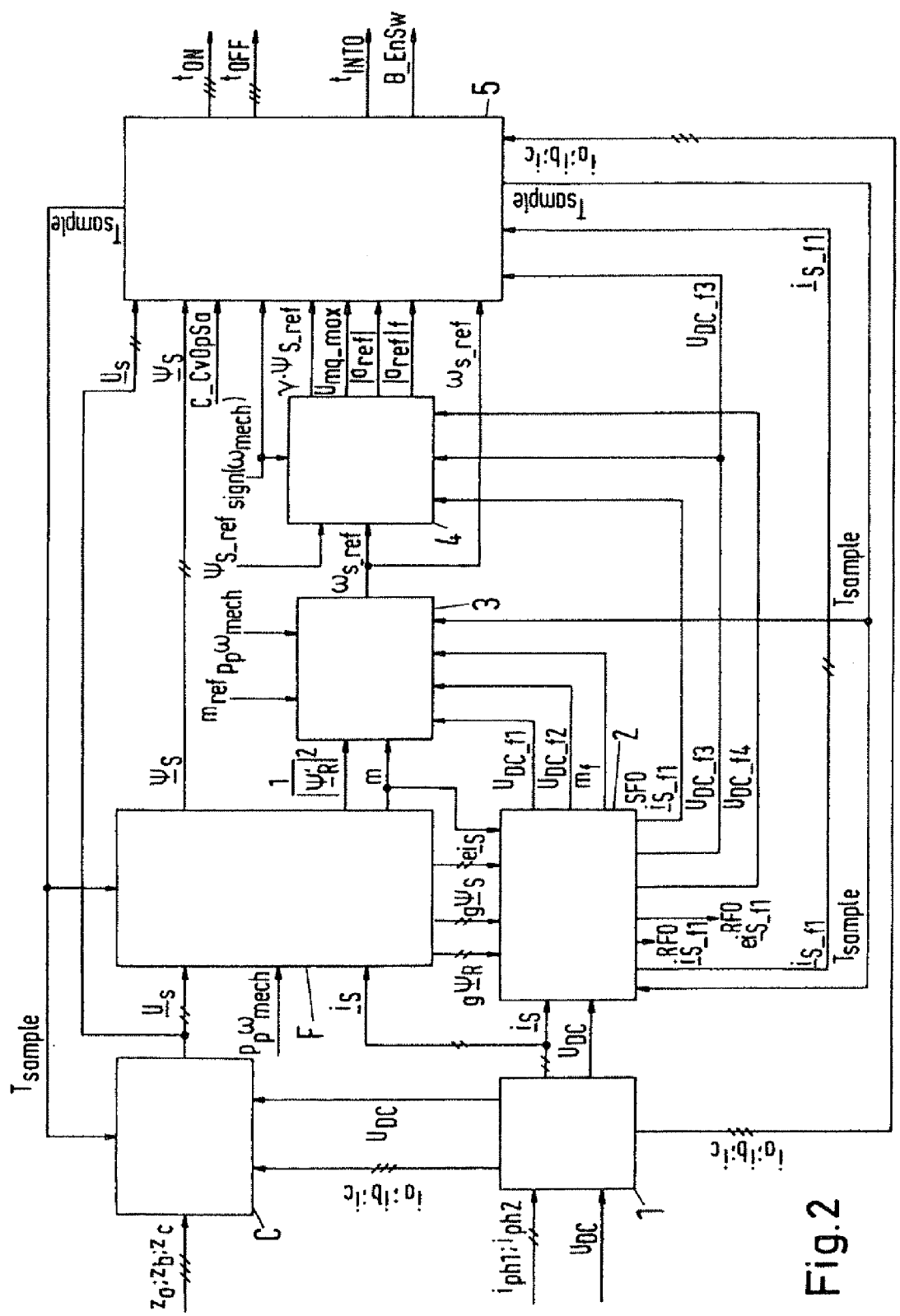
Figure 5:
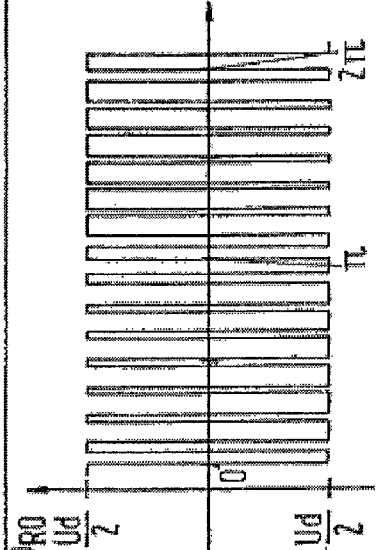
Figure 6:
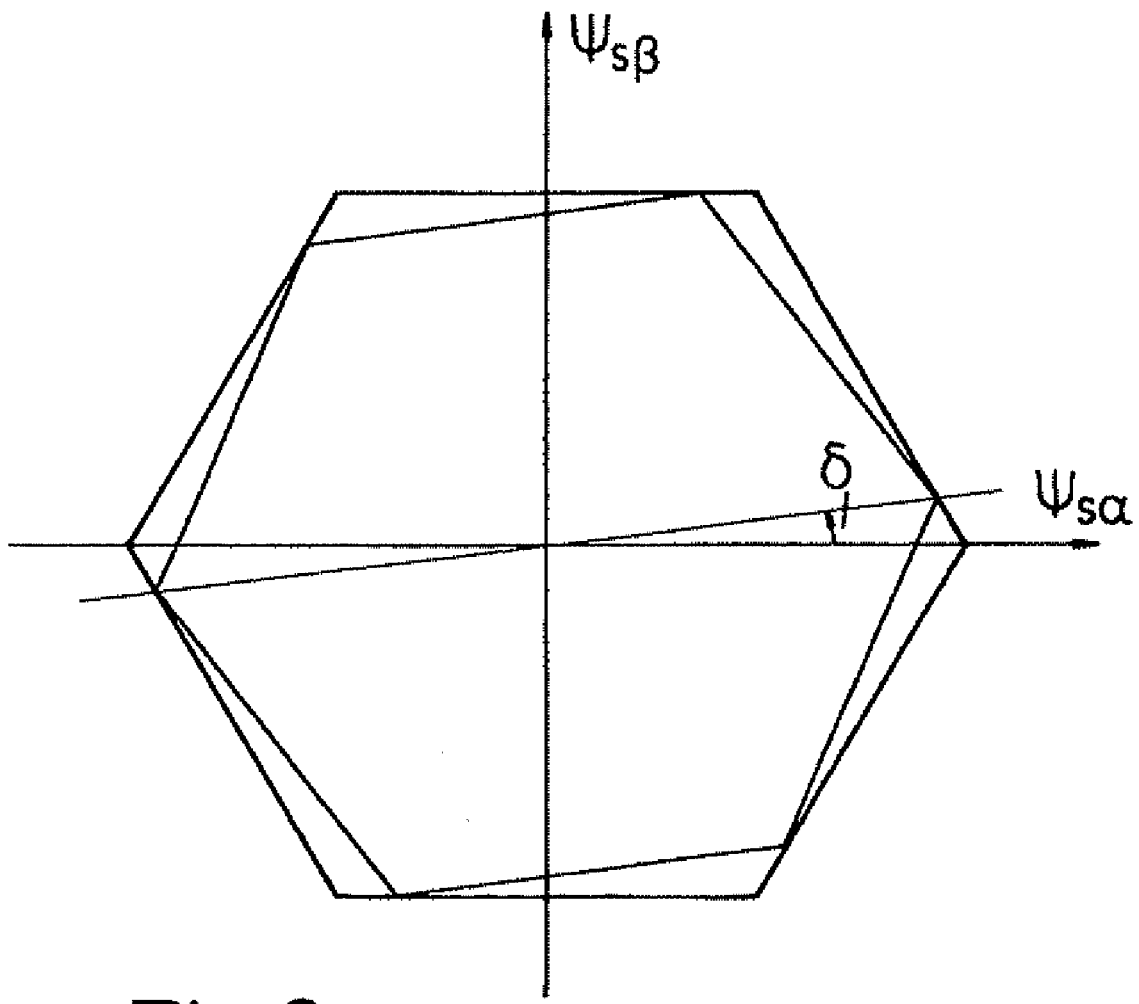
Figure 7:
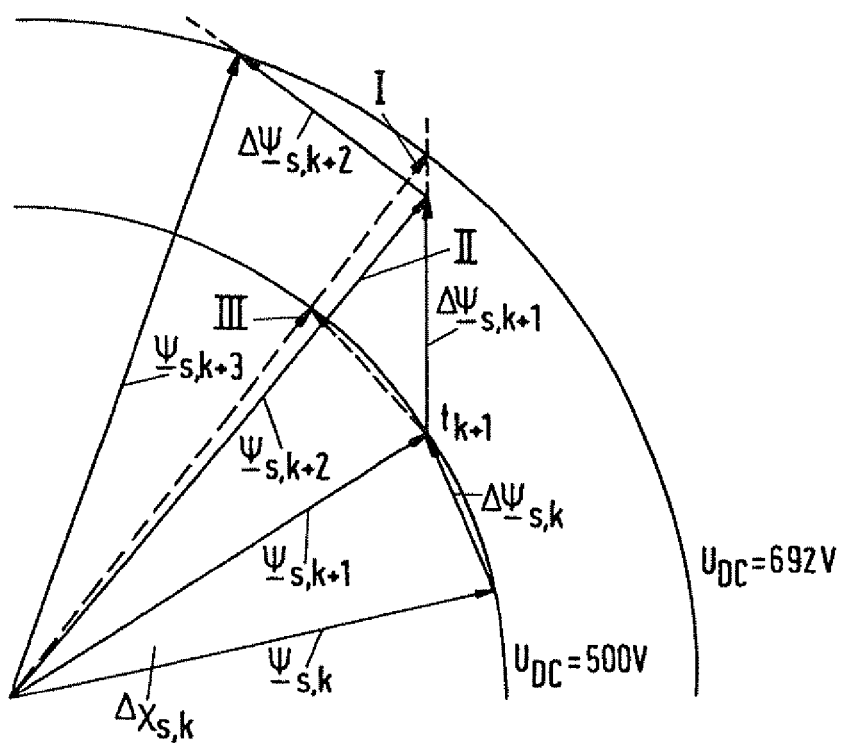
Figure 8:
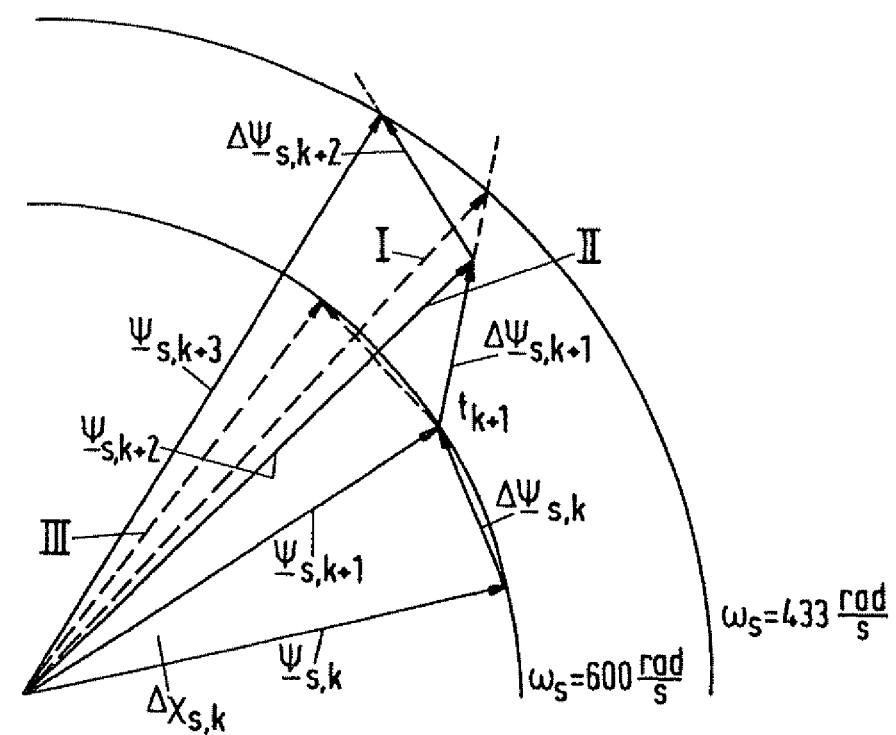
Figure 9:
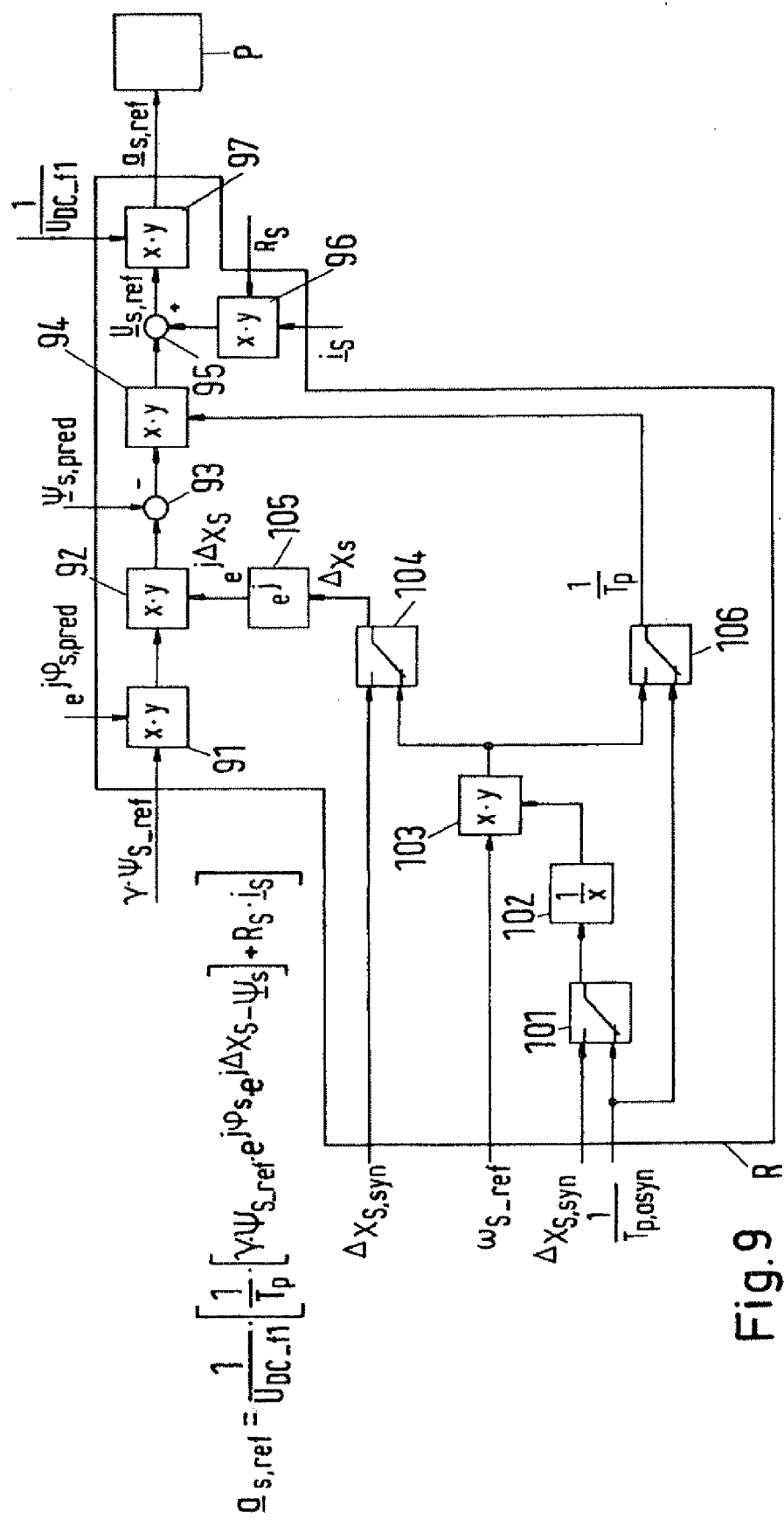
Figure 10:
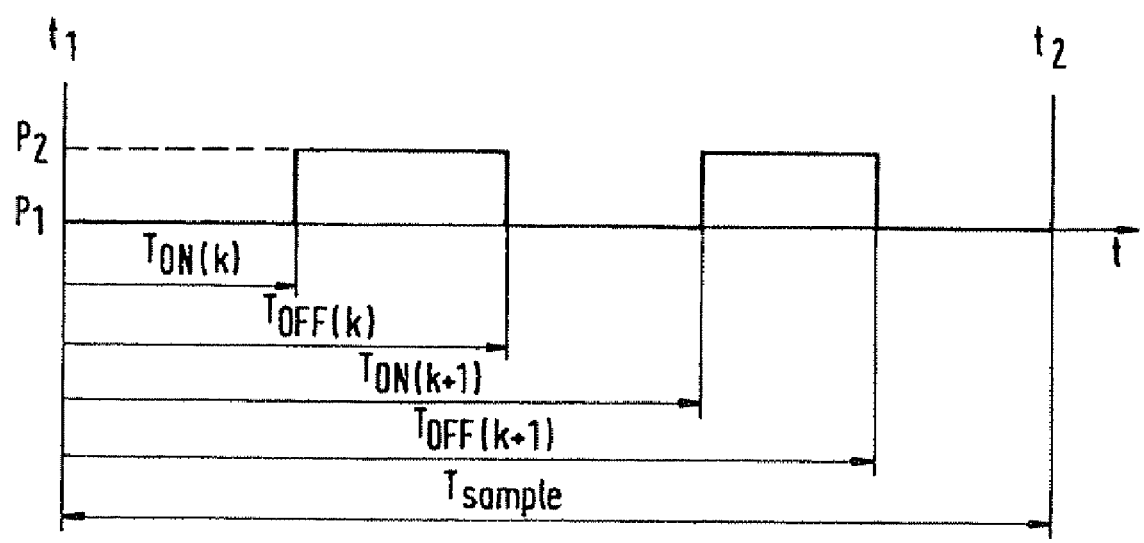
Figure 11:
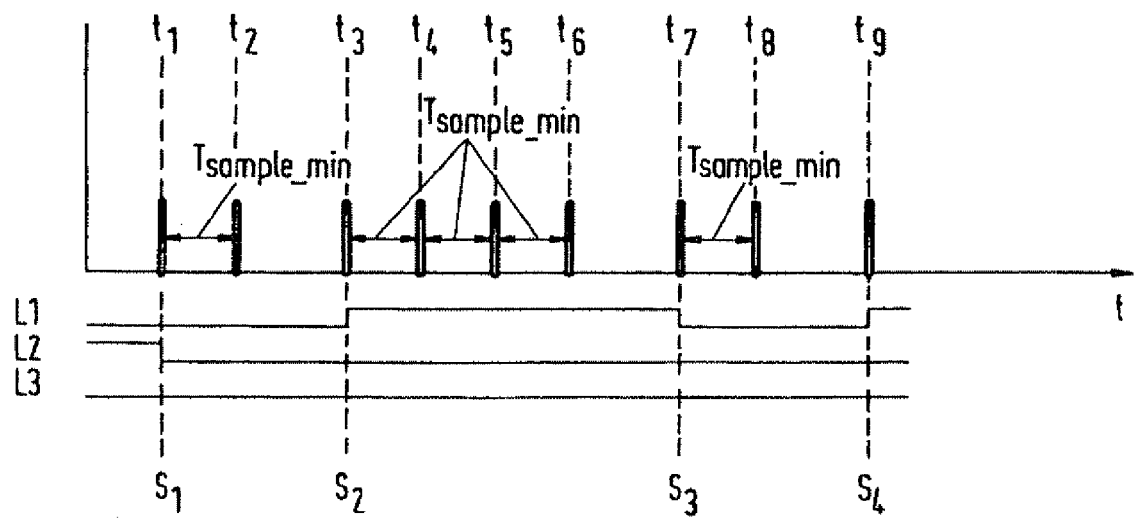
Figure 12:
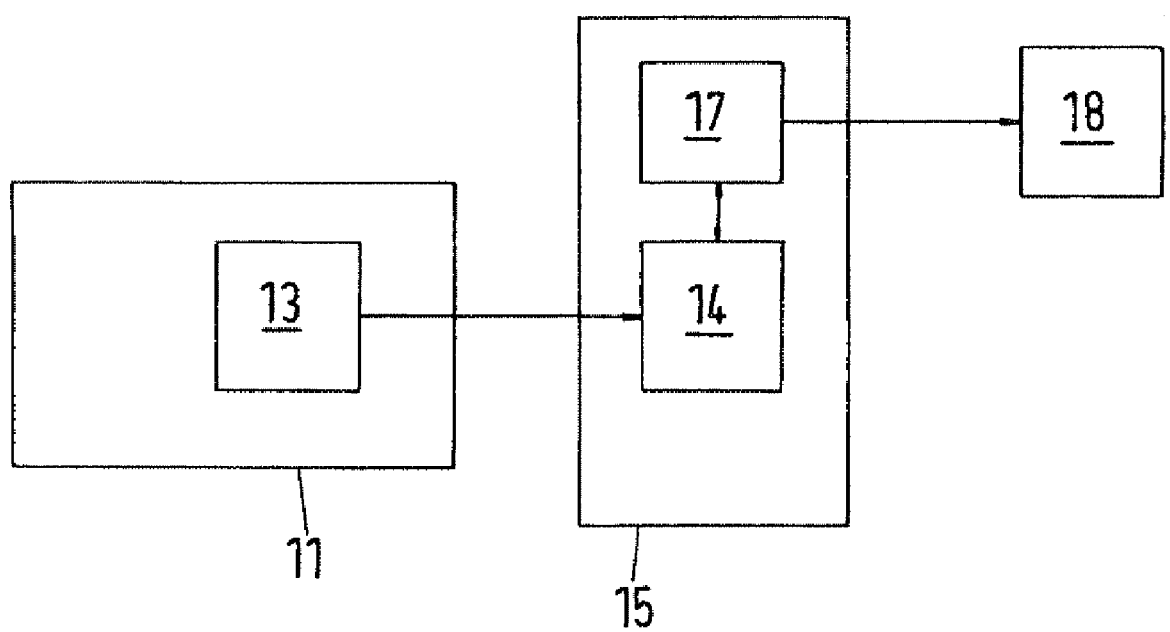
Figure 13:
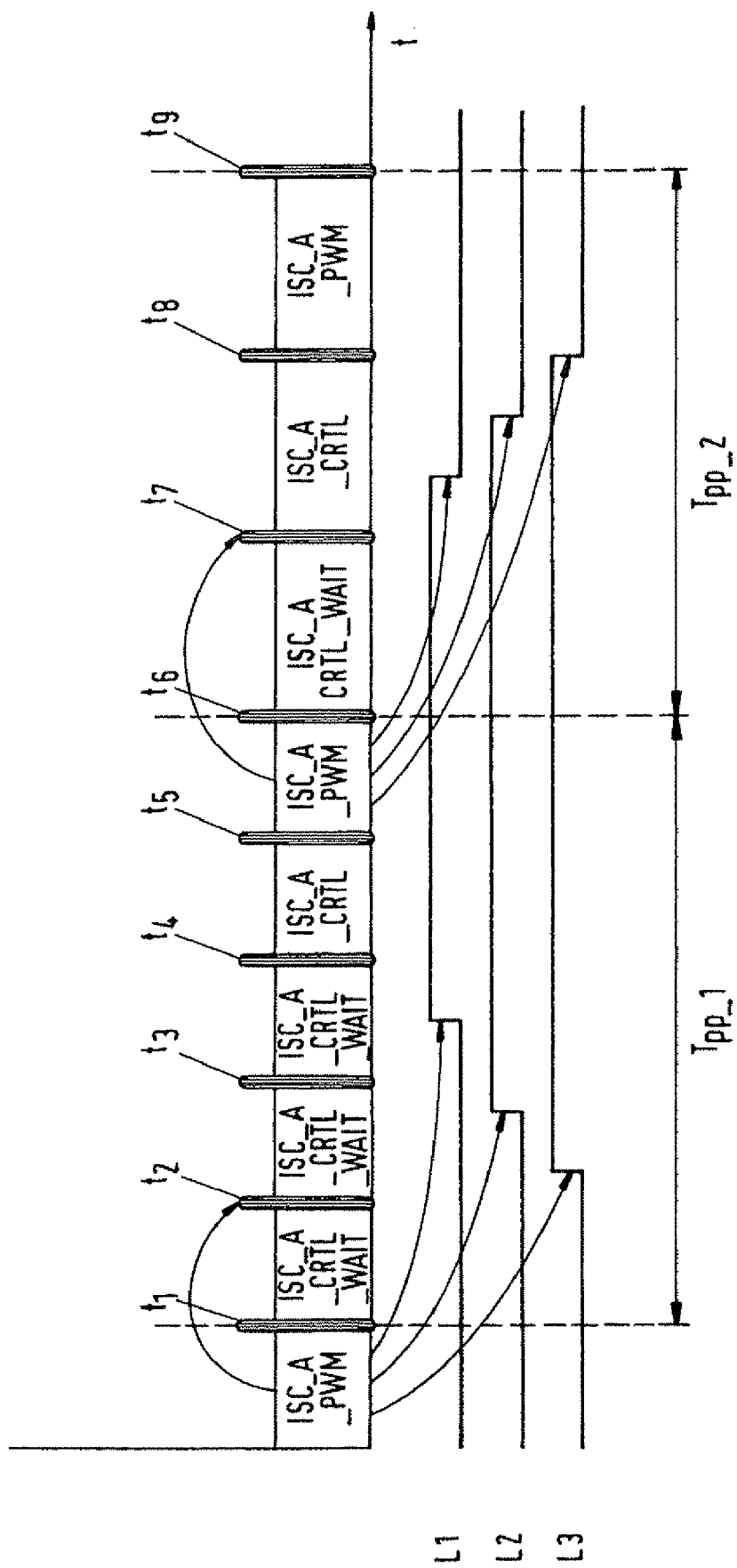
Figure 14:
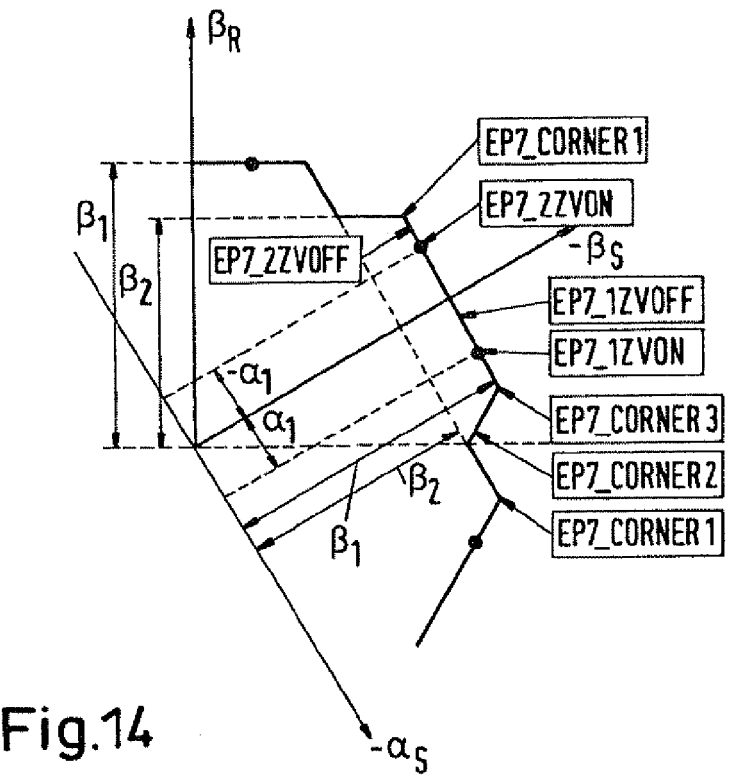
Figure 15:
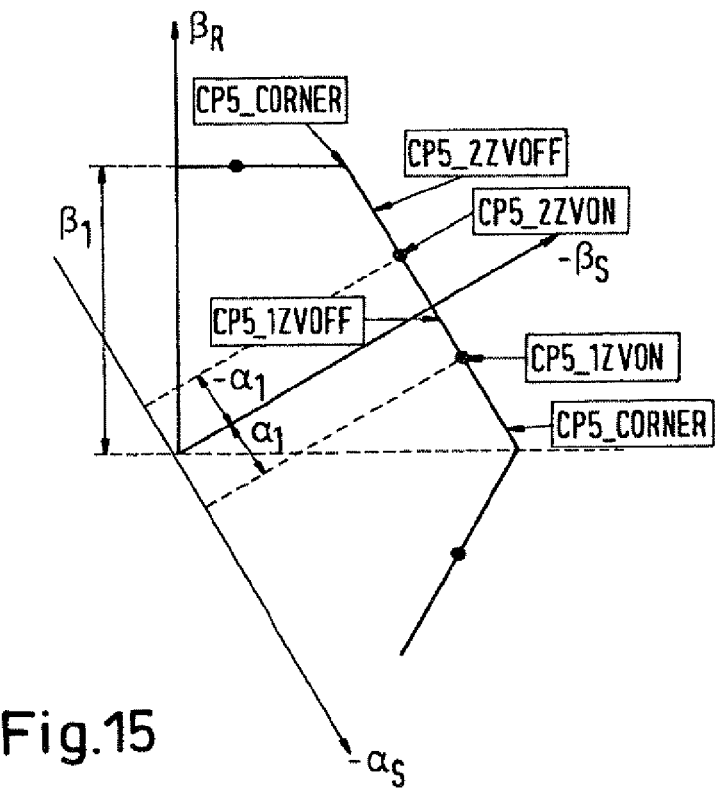
Figure 16:
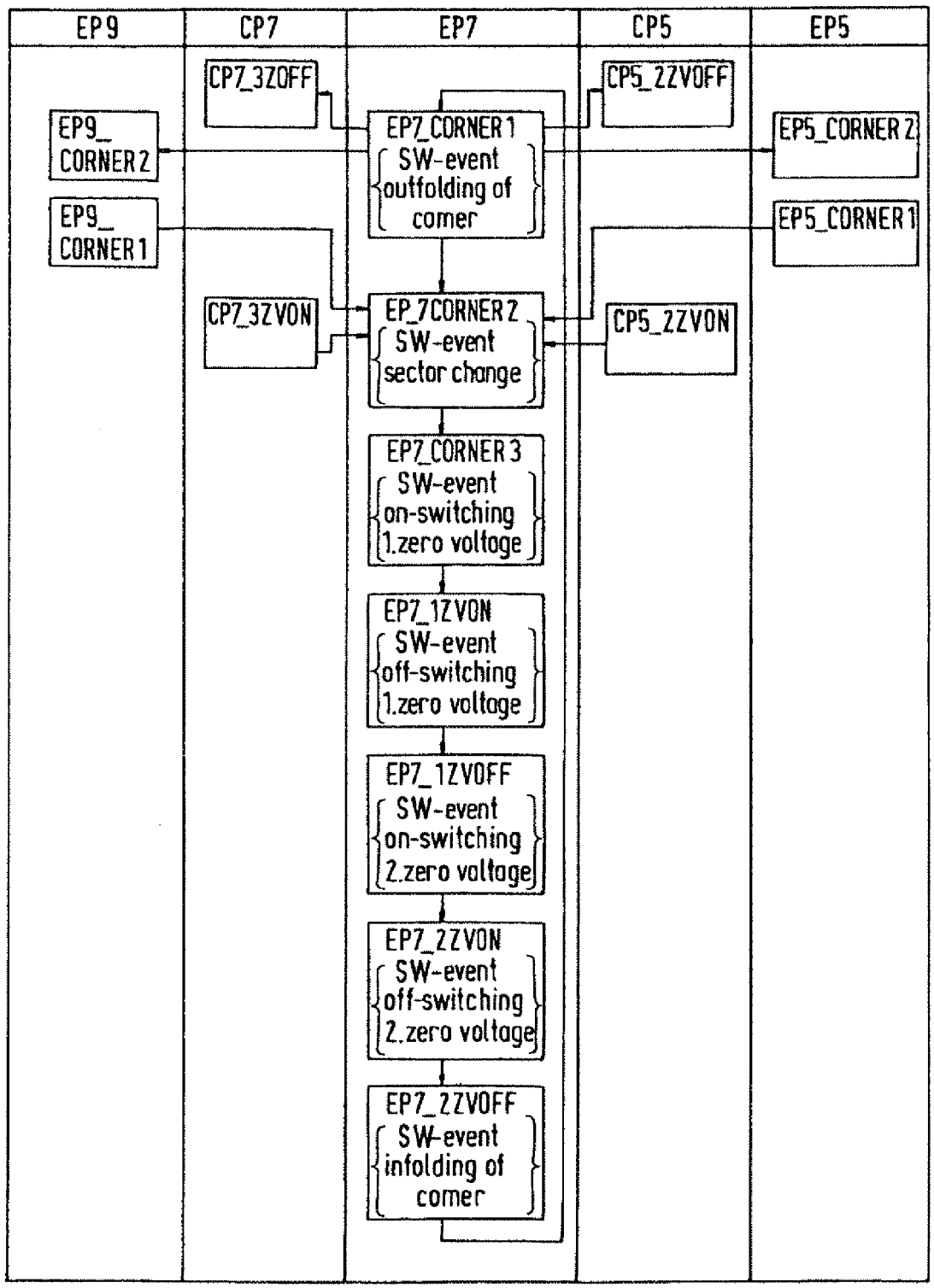
Figure 17:
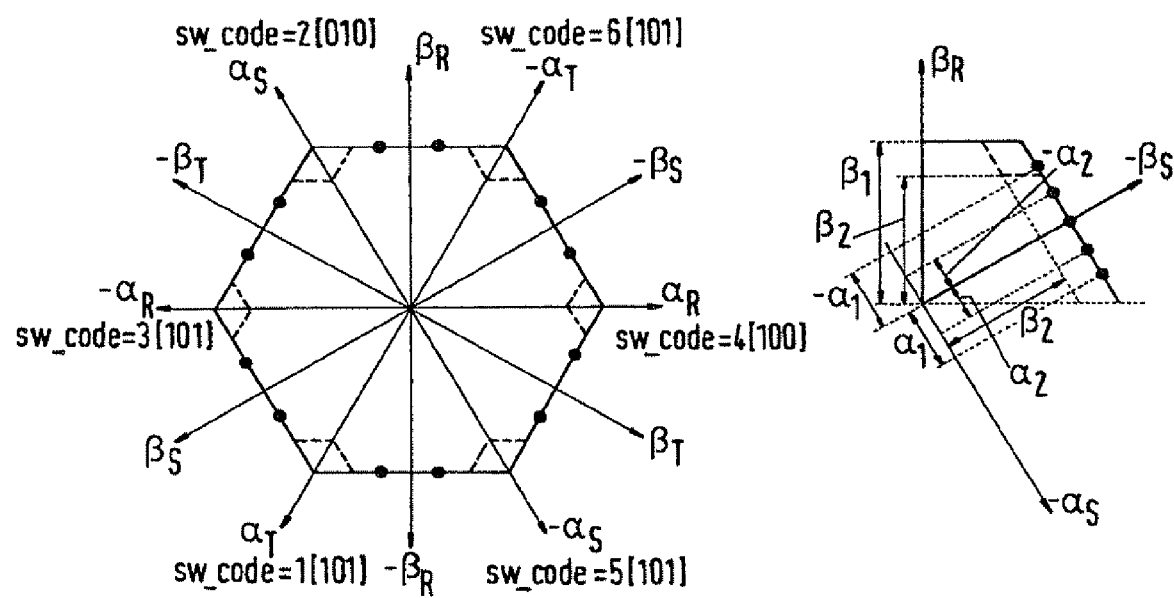

Exemplary embodiments and additional preferred features of this invention are described in greater detail below with reference to the accompanying drawing. The individual figures of the drawing show:

FIG. 1 the structure of one particularly preferred embodiment of the control device claimed by the invention;

FIG. 2 details of the structure illustrated in FIG. 1, whereby, however, different interfaces and therefore to some extent other units are shown;

FIG. 3 a schematic illustration of stator voltage and stator flux trajectory for stator flux guided pulses with collapsed corners;

FIG. 4 a schematic illustration of stator voltage and stator flux trajectory for stator flux guided pulses without collapsed corners, i.e. with a hexagonal flux diagram;

FIG. 5 a schematic illustration of stator voltage and stator flux trajectory for PWM-based, synchronous pulses;

FIG. 6 a schematic illustration of the effect of the flux twisting;

FIG. 7 an illustration of different chronological sampling values of the stator flux indicator over a number of sampling cycles or control cycles of the control method claimed by the invention with pulse pattern generation based on mean values, whereby the intermediate circuit voltage is increased suddenly during these cycles;

FIG. 8 an illustration of different chronological sampling values of the stator flux indicator over a number of sampling cycles or control cycles of the closed-loop control method claimed by the invention with pulse pattern generation based on mean values, whereby the speed of rotation of the machine (e.g. on account of a load change) is reduced suddenly during these cycles;

FIG. 9 is a signal flux diagram which shows schematically the mode of operation of one particularly preferred embodiment of the control method claimed by the invention with pulse pattern generation based on mean values with dead-beat response of the stator flux control;

FIG. 10 shows a sampling interval in which two switchovers are made within one power converter phase;

FIG. 11 represents a period of time with a plurality of sampling intervals, whereby different numbers and different lengths of sampling intervals lie between the individual switching operations;

FIG. 12 shows a symbolic arrangement with elements for the calculation of the switching instants and for the execution of the switching operations;

FIG. 13 is a time diagram with a chronological sequence of sampling instants and the interval of time between each pair of sampling instants, which are used for various computation tasks and operations of the control system with a pulse pattern generation based on mean values, and the respective switching status of the three power converter phases;

FIG. 14 shows a detail of the stator flux trajectory with the individual sub-states of the state machine per sector for 7× cycles with collapsed corners;

FIG. 15 shows a detail of the stator flux trajectory with the individual sub-states of the state machine per sector for 5× cycles without collapsed corners;

FIG. 16 is a state transition diagram with the individual sub-states including pulse pattern change in adjacent methods for 7× cycles with collapsed corners and FIG. 17 shows the projection axes for flux comparison of the stator flux guided pulse generation as well as the definition of the switching angle.

DETAILED DESCRIPTION OF THE INVENTION

FIG. 1 shows a structure A of the overall drive control system of a three-phase asynchronous machine which can be operated optionally with or without a tachometer generator. Specifically shown and provided with the following reference numbers are: a pulse pattern generator B, a slip frequency or torque controller E, a device D for the optional speed estimation (speed estimator), a device F for the simulation of the flux linkages (stator and rotor flux) and of the torque (flux observer), a device C for the modeling of the method of a power converter G actuated by the structure A, and a device H for disturbance compensation which contains an inverse power converter model.

The pulse pattern generator B which is realized within a signal-controlled or microprocessor-controlled electronic signal system is responsible for the performance of an essential part of the method claimed by the invention. It implements the control method claimed by the invention with pulse pattern generation based on mean values and dead-beat response of the stator flux control (within device J). It also includes an implementation of a stator flux guided pulse pattern generator based on instantaneous values (within the device M).

The device H is connected on the input side with the pulse pattern generator B from which it receives signals that specify the switching instants of the power converter phases of the power converter G. On the output side, the device H is connected with the actuator units of the rectifiers of the power converter G and transmits pulse signals to the rectifiers that turn the power converter G on and off. During the generation of the pulse signals, the device H compensates in a known manner for disturbances and also monitors the interlock and minimum switching time of the individual rectifiers.

The temporal curve of the input signals of the device H can be based on different pulse patterns. In particular at the beginning of the magnetization process of the asynchronous machine K, the input signals can come from the unit L of the pulse pattern generator B, and during further operation with pulse patterns based on mean values, e.g. pulse-width modulation (PWM) pulse patterns originate from the unit J, or during operation with stator flux trajectory guided pulse patterns, the pulse patterns originate from the unit M, which is also part of the pulse pattern generator B.

As shown in FIG. 1, the stator flux controller which is provided for the generation of pulse patterns based on mean values can inherently be designated the pulse pattern generator B. This stator flux controller is designated by the reference letter R in FIG. 1.

FIG. 1 also shows the asynchronous machine K which is connected via three phases with the power converter G, a current measurement device N which measures currents through at least two of the three phases, a voltage sensor O which measures the intermediate circuit voltage at the input of the power converter G and an optional tachometer generator P.

The illustration of the structure A in FIG. 1 is intended to be understood schematically and shows only the essential parts of the structure. Additional details are described below with reference to FIG. 2, in which the elements and devices external to the structure are not shown.

FIG. 2 shows a total of seven devices of the structure A. The device C (power converter model) and the flux observer F are thereby identical to the corresponding devices illustrated in FIG. 1. The pulse pattern generator 5, however, differs from the pulse pattern generator B in FIG. 1 in that it has different interfaces. In turn, however, it can contain the stator flux controller with the dead-beat response claimed by the invention and the downstream pulse pattern generator for pulses based on mean values as well as additional pulse pattern generators for other pulses.

FIG. 2 also shows a device 1 for the capture of analog measurements (analog measured value capture), a set of filter devices 2, a device 3 for the intermediate circuit stabilization, for the realization of a pull-out protection, for a steady-state stator flux limitation and for a slip frequency control as well as a device 4 for the calculation of the magnetization voltage and the modulation of the asynchronous machine. The slip frequency controller E illustrated in FIG. 1 is in particular a part of the device 3 illustrated in FIG. 2. Interfaces between the illustrated units and the physical variables received, output or transmitted are also illustrated in FIG. 2. Additional details will be provided below on the meaning of the symbols used in FIG. 2 as soon as and to the extent they are necessary for an understanding of the invention.

As output variables of device 4, the values of which are transmitted to the pulse pattern generator 5, FIG. 2 shows in particular the reference value modulations $|a_{ref}|$ and $|a_{ref}|_f$. These reference value modulations are used in particular as input variables for equations [5] and [7] and/or for the decision whether the pulse pattern type is to be changed.

All of the calculations and/or operations executed by the units in FIG. 2 are, with few exceptions, performed between two sampling instants of the measured variables which are necessary for the operation of the structure A. The measured variables are in particular the intermediate circuit voltage $U_{DC}$, the currents $i_{ph1}$, $i_{ph2}$ through two of the three phases between the power converter G and the asynchronous machine K (these measured variables are transmitted to the unit 1) and optionally the speed $\omega_{mech}$ of the asynchronous machine K multiplied by the number of pole pairs $p_p$.

When it is determined that the switching actions of the valves of the power converter must be calculated subsequently, i.e. at the next future sampling instant, all of the required calculation tasks are executed by the seven units within one sampling cycle, i.e. between two successive sampling instants. Cases in which only some of the units and/or only some of the tasks will be processed within one sampling cycle, e.g. because new switching actions must be calculated by the subsequent sampling instant, will be discussed in greater detail below.

As indicated above, unit 1 receives measured values of at least two of the three phase currents and one measured value of the intermediate circuit voltage. It calculates the components of a stator current space vector with reference to the stator coordinate system of the asynchronous motor. These components are transmitted as space vectors to, among other things, the devices 3 (flux model) and 4 (filter). The two measured phase currents and the third calculated phase current are transmitted to the devices C and B.

The device C (power converter model), uses the information on the intermediate circuit voltage and suitably determined phase switching information, as well as the measured power converter phase currents (additional details on the operation and variants of device C are described, for example, in EP 09 45 970 and in EP 09 45 956), calculates a terminal voltage space vector, which is in turn referenced to the stator coordinate system of the asynchronous machine.

In the flux observer F, a switchable or continuously evolving flux model (voltage model, current model) is implemented which calculates the state variables of the three-phase asynchronous machine (in particular the stator flux space vector, the rotor flux space vector and their orientation angle), and the torque derived from them. For additional details, reference is made to the descriptive introduction and to WO 2005/018186. The voltage model also calculates an estimated stator current space vector which can advantageously be used together with the measured stator current space vector, e.g. to estimate the speed or temperature of the asynchronous machine and/or in the context of a mode for the simulation of the power converter for an actual value simulation. An adaptation or tracking of the operationally variable parameters of the equivalent electrical circuit diagrams of the asynchronous machine also takes place in device F, in particular of the parameters stator and rotor resistance, main inductivity and of the equivalent iron loss current or resistance.

In the filter devices 2, an adaptive filtering (with variable sampling time and with corner frequencies defined as a function of the pulse pattern) with first or second order filters takes place. There is a filtration of the measurements of the intermediate circuit voltage and of the stator current space vector in various coordinate systems (shown as initial values and to some extent connected with other devices that are also shown, the stator current space vectors are in stator coordinates, in stator flux and rotor flux coordinates, and the fault current space vectors in rotor flux coordinates). These vector values are preferably filtered in the field coordinates (i.e. in stator flux and/or rotor flux coordinates). Calculation results, e.g. computed values of other devices, in particular of the flux observer F, are also filtered to attenuate harmonics which are caused by the switching response of the power converter and/or by the pulse pattern. In particular, the scalar values intermediate circuit voltage and estimated torque can each be filtered with a plurality of different filters.

As described above, the device 3 performs a pull-out slip limitation and a steady-state stator current limitation for the protection of the power converter and/or of the machine. The stabilization of the LC input filter with DC direct feed also performs a $U_{DC}$ injection, i.e. an intrusion of the voltage ripple of the direct current (DC) intermediate voltage to the torque or slip frequency reference value, e.g. as described in DE 4110225.

The device 3 also performs the actual slip frequency control. Assuming a constant flux, this is equivalent to a torque control, although for the above mentioned pull-out protection it ensures that the maximum specified slip frequency is maintained. As the output variable, the device 3 emits a reference value $\omega_{S\_ref}$ of the stator frequency, with which the stator flux space vector must rotate in the coordinate system corresponding to the stator.

This value output by the device 3 is transmitted on one hand to the pulse pattern generator B and on the other hand to the magnetization voltage and modulation calculation implemented in the device 4.

The device 4 performs, among other things, a calculation of the maximum fundamental oscillation magnetization voltage for the purpose of the field weakening control and the modulation calculation. The amount of the maximum magnetization voltage $|u_{mq}'|_{max}$ is calculated in particular according to the following equation:

$$U_{mq\_max} = \sqrt{\left(\frac{2}{\pi} U_{DC}\right)^2 - (R_S i_{Sd})^2} - R_S i_{Sq} \cdot \text{sign}(\omega_{Fs}) \quad [1]$$

in which $R_S$ is the equivalent stator resistance of the machine, $i_{Sd}$ is the filtered real component of the stator current space vector in the stator flux oriented coordinate system; $i_{Sq}$ is the filtered imaginary portion of the stator flux space vector in the stator flux oriented coordinated system and $\omega_{Fs}$ is the stator frequency reference value.

The reference value modulation $|a_{ref}|$ of the power converter or of the machine is defined as the quotient of the current magnetization voltage $U_{mq}$ and the maximum magnetization voltage $U_{mq\_max}$. It is calculated in particular as follows:

$$|a_{ref}| \approx \frac{U_{mq}}{U_{mq\_max}} = \frac{|\omega_{FS} \cdot \psi_{S\_ref}|}{U_{mq\_max}}, \quad [2]$$

where $\psi_{S\_ref}$ is the stator flux reference value. The output variable of device 4, which is output to the pulse pattern generator B, is the product of the field weakening coefficient $\gamma$ and the stator flux reference value $\psi_{S\_ref}$, which is calculated according to the following equation [3]:

$$\gamma \cdot \Psi_{s\_ref} = \frac{|a_{ref,lim}| \cdot U_{mq\_max}}{\omega_{FS}}, \quad [3]$$

where $|a_{ref,lim}|$ is the maximum modulation of the respective instantaneous pulse pattern, when the modulation, when the modulation $|a_{ref}|$ calculated with the above referenced equation is greater than or equal to the maximum modulation, and where $|a_{ref,lim}|$ is equal to the modulation $|a_{ref}|$ when the modulation is less than the maximum modulation. The field weakening coefficient $\gamma$ is thereby limited to its maximum value 1.

In one preferred configuration of the invention, the functions of the devices 1 to 4 and C and F, which were previously calculated on the basis of FIG. 2, are identical in the entire operating range of the drive and regardless of the pulse method used, i.e.

asynchronous and/or synchronous pulses based on mean values, stator flux guided synchronous pulses, including full block operation, based on instantaneous values.

Therefore in this case, with the exception of the pulse pattern generation (device B), the same control structure is used for all pulse methods. This is true not only for the special embodiment described here, but can also be the case in other configurations of the invention. Any structural changeovers that may be necessary in other control methods of the prior art, with the related separation phenomena between the different control structures, can also be eliminated.

The calculation for the ON and OFF times for the individual power converter phases ($t_{ON}$ and/or $t_{OFF}$) and the control of the sampling times $t_{INTO}$ can also be performed in the pulse pattern generator B.

In the concrete exemplary embodiment which is described here, starting from the common control system section (slip frequency controller, device 3), 3 different categories of pulse patterns can be generated. The power converter is in each case operated only with pulse patterns from one of the categories, whereby a change into another category is easily possible. Pulse patterns in the first category are generated after a power converter block at the beginning of the magnetization process of the machine (unit L in FIG. 1 generates this pulse pattern, whereby both magnetization processes of a completely demagnetized and partly demagnetized machine are possible). Asynchronous and synchronous pulses based on mean values fall into the second category of the pulse pattern based on mean values (unit J in FIG. 1). Not only in the configuration described here, however, other mean value based pulse patterns are possible, e.g. (7×, 5×, 3× cycles or block cycles as described in Stanke G., Hortmann D.: "Die stromrichternahe Antriebsregelung des Steuergerätes für Bahnautomatisierungssysteme SIBAS32" [Power converter drive control of the control unit for SIBAS32 railway automation systems], eb-Elektrische Bahnen, Vol. 90 (1992, No. 11, pp. 344-350 and Richter S.: "Analyse und Bewertung von Steuerverfahren für pulsumrichtergespeiste Asynchronmaschinen" [Analysis and evaluation of control methods for pulse converter fed asynchronous machines], Dissertation 1996, VDI-Fortschrittsberichte, Series 21, No. 207). Flux trajectory guided pulse patterns based on instantaneous values (third category) are generated by unit M in FIG. 1.

FIG. 12 shows an arrangement for the control of the valves of a power converter. The arrangement has an open-loop and/or closed-loop control device 11, one advantageous exemplary embodiment of which was explained with reference to FIG. 2 above.

One component of the device 11 is a switching time calculation unit 13 (see also device B in FIG. 1 or FIG. 2) for the calculation of the phase switching times, each of which calculates, in successive calculation cycles and on the basis of current sampling values, the switching times which are to be written in a register 14 (also called (Compare Capture Units) which is independent of the processor.

The register 14, in the exemplary embodiment described here, can be part of a programmable logic 15 which is independent of the processor, and which can be realized, for example, in a FPGA (field programmable gate array). Within this logic, the individual register contents are compared with a cyclically variable value (counter). When one of the values in the registers for the respective switching times coincides with the cyclically variable value, the switching action (ON/OFF) associated with the register is automatically executed at the corresponding switching instant (k, l+1). The logic control system emits a corresponding signal which is transmitted to a rectifier control device (interlock device) 18, which controls the corresponding switching actions of the valves, in particular the switching of the valve of the power converter, taking the interlock and minimum switching times into consideration.

The pulse pattern generator B is implemented in the cyclical running microprocessor or signal processor program, preferably in the form of a state machine with a main state for each pulse pattern category and various sub-states for each pulse pattern category. An illustration for each pulse method is presented in the accompanying FIGS. 14, 15, 16.

FIGS. 3 to 5 show pulse patterns in the categories based on mean values (FIG. 5 shows the PWM pulse pattern in particular) and on instantaneous values (FIGS. 3 and 4). In all three figures, a number of different pulse patterns in the respective categories are shown. Each of the figures is organized as a table, where the first column shows the name or abbreviation for the pulse pattern, the second column shows the theoretical temporal curve of the stator voltage for the individual phase, whereby the stator voltage can be switched back and forth between its instantaneous maximum value $+U_{DC}/2$ and its instantaneous minimum value $-U_{DC}/2$. The third column shows the stator flux trajectory with reference to a coordinate system of the stator, and the fourth column shows the number of zero voltages during a period (i.e. during one rotation of the tip of the stator flux indicator counterclockwise on the stator flux diagram). The stator flux pointer thereby rotates around the origin of the coordinate system and the zero voltages are indicated by small black circles on the stator flux diagram, i.e. a zero voltage is switched when the tip of the stator flux pointer reaches the circle.

The switching angles of the corresponding synchronous pulses can be optimized offline, to the extent permitted by the degree of freedom of the switching actions such as minimum effective value of the harmonic current or minimum ripple torques or system perturbations. The switching angles stored in table form, for example (see also FIGS. 14 and 15) represent the basis for the flux-guided modulator.

FIG. 14 shows, for one sector of the flux trajectory with synchronous 7× pulsing with collapsed corners (main state EP7), the above mentioned sub-states of the state machine and their correspondence to the respective sub-segment of the stator flux trajectory for a mathematically positive direction of rotation.

FIG. 15 shows, for a sector of the flux trajectory with synchronous 5× pulsing without collapsed corners (CP5), the above mentioned sub-states of the state machine and their corresponding to the respective sub-segment of the stator flux trajectory for a mathematically positive direction of rotation.

FIG. 16 shows the state transition diagram, using the example of the synchronous 7× pulsing with collapsed corners, including the change states into and from directly adjacent pulse methods.

Up to four switching actions located in the future can be calculated for each sub-state, using additional features of the invention (FIG. 10) which are described in greater detail below.

The advantageous embodiments of the invention described above make possible a processing which is optimal in terms of computer time within the real-time system on one hand and ease of expandability on the other hand.

In an additional advantageous embodiment of the method, for example, in the event of highly dynamic variations of the intermediate circuit voltage and/or of the speed, to prevent instantaneous power shutdowns as quickly as possible for the easy switching from dynamic zero voltages into the known methods DSR or DSR with collapsed corners (i.e. the stator flux trajectory is not a hexagon as illustrated in FIG. 4, but at the points at which the corners lie in the DSR, runs inward in a straight line from the corner of the hexagon and then outward again in a straight line to the corner of the hexagon, see FIG. 3).

The synchronous pulse generation based on instantaneous values is realized by means of a comparison of a specified stator flux trajectory calculated according to the specified switching angle and a modified actual value of the stator flux trajectory determined by means of the flux observer.

The projections of the stator flux trajectory shown in FIG. 17 can be advantageously used for this purpose, so that the comparison of the fluxes claimed by the invention (basis of the stator flux guided pulse generation) inside the state machine need only be programmed for one sector.

The calculation of a virtual terminal flux which is required for other methods (see, for example, WO 2005/018086) and can be very time-consuming, is eliminated by means of the compensation of the stator flux twist as a function of the load and resistance.

FIG. 6 shows the twisted flux figure, which has been twisted counterclockwise by the angle δ compared to the flux diagram corrected by the compensation.

The actual value of the stator flux vector diagram, prior to the projection onto the projection axes illustrated in FIG. 14, has been twisted back by the correction angle (shown here by way of example for a positive direction of rotation, in accordance with the equations [4] presented below in the coordinate origin.

$$u_{Sd}^{SFO} \approx R_S i_{Sd}^{SFO} \qquad [4]$$

$$u_{Sq}^{SFO} = R_S i_{Sq}^{SFO} + u'_{mq} = R_S i_{Sq}^{SFO} + \omega_{FS} \cdot \gamma \cdot \psi_{S\_ref}$$

$$|u_S| = \sqrt{(u_{Sd}^{SFO})^2 + (u_{Sq}^{SFO})^2}$$

$$\cos(\varepsilon_U) = \frac{u_{Sd}^{SFO}}{|u_S|}; \sin(\varepsilon_U) = \frac{u_{Sq}^{SFO}}{|u_S|}$$

$$\cos(\delta) = \cos\left(\frac{\pi}{2} - \varepsilon_U\right) = \sin(\varepsilon_U) = \frac{u_{Sq}^{SFO}}{|u_S|}$$

$$\sin(\delta) = \sin\left(\frac{\pi}{2} - \varepsilon_U\right) = \cos(\varepsilon_U) = \frac{u_{Sd}^{SFO}}{|u_S|}$$

The flux-guided switch time is calculated using the equations below for the individual basic switching actions listed:

The following portion of the description relates to an example for the calculation of the period of time until the switching of an active voltage (also called external voltage), see also FIG. 17 sw_code=1 . . . 6. The algorithm explained below is used for the switching time calculation such as Time until the sector change (CP method, see FIG. 4, for example).

Time until the collapse of a corner (EP method, as in FIG. 3, for example).

Time until the un-collapsing of a corner (EP method, as in FIG. 3, for example).

$$\psi_{\beta\_ref} = \gamma \cdot \psi_{S\_ref} \cdot \beta_N(|a_{ref}|); N = 1, 2 \quad [5]$$

$$dt = \frac{3}{\pi\cos\left(\frac{\pi}{6}\right)} \frac{1}{U_{mq\_max}} (\psi_{\beta\_ref} - \psi_{\beta\_x});$$

$$x = L1, L2, L3, NL1, NL2, NL3$$

The respective β-flux thresholds for each pulse pattern as a function of the specified modulation and the respective switching action (sector change or corner modulation) are stored in table form. The transformation (see FIG. 17) used for the instantaneous flux vector (L1, L2, L3, NL1, NL2, NL3) is a function of the instantaneous sector of the stator flux and the direction of rotation. The variable $U_{mq\_max}$ represents the instantaneous maximum magnetization voltage of the induction machine according to the equation presented above.

The calculation of the zero voltages is explained below. As shown in FIG. 17, the switching events "zero voltage ON" (shown in the figure as dots or small circles) are determined by the α-flux thresholds. Depending on the number of zero vectors per pulse pattern, different flux thresholds are used. Table 1 shows the association between the pulse patterns and the switching angle of the zero vectors with the number of zero vectors per sector.

TABLE 1

| Number of zero vectors per sector | Pulse pattern | Zero vector angle used |
|---|---|---|
| 1 | CP3, EP5 | Zero |
| 2 | CP5, EP7 | $\alpha_1; -\alpha_1$ |
| 3 | CP7, EP9 | $\alpha_1$; zero; $-\alpha_1$ |

The inner α-flux threshold $\alpha_2$ (see FIG. 17) is not used by the pulses (see FIGS. 3 and 4) indicated by way of example in the advantageous embodiments or assumes the insignificant value 0, because the maximum number of zero voltages per sector is less than or equal to three in the case of the pulse pattern CPx (x=3, 5, 7) or EPy (y=3, 5, 7, 9). The inner flux threshold $\alpha_2$ would be applied in an additional embodiment not discussed in any further detail, e.g. a pulse pattern CP9 in a logical extension of the illustration in FIG. 4.

The algorithm below is used for the calculation of the switching time until the next event "zero voltage ON". The algorithm is valid for both pulse methods CP (center pulsing) and EP (corner pulsing) which are explained in greater detail below:

$$\psi_{\alpha\_ref} = \gamma \cdot \psi_{S\_ref} \cdot \alpha_N(|a_{ref}|); N = 1, 2 \quad [6]$$

$$dt = -\frac{3}{\pi} \frac{1}{U_{mq\_max}} (\psi_{\alpha\_ref} - \psi_{\alpha\_x});$$

$$x = L1, L2, L3, NL1, NL2, NL3$$

The respective α-flux thresholds for each pulse pattern as functions of the reference value modulation and of the respective switching action (individual number of the zero voltage) are stored in table form. The transformation used for the instantaneous flux vector (L1, L2, L3, NL1, NL2, NL3) is a function of the instantaneous sector of the stator flux and the direction of rotation. The variable $|u_{mq}'|_{max}$ designates the instantaneous maximum magnetization voltage of the induction machine according to the above equation.

The calculation of the time for the "zero voltage OFF" is described below. The following specification for the calculation of the switching time dt until the next "zero voltage OFF" event is used with both pulse methods CP and EP:

$$dt = \frac{\varphi_{ZV}(|a_{ref}|)}{\omega_{s\_ref}} \quad [7]$$

The zero voltage angle $\phi_{ZV}$ used is stored in table form for each pulse pattern as functions of the specified modulation and the respective switching action (respective number of the zero voltage).

The above mentioned switching angles stored in tables can be calculated offline according to various optimization criteria such as, for example, minimum effective value of the harmonic current or minimum ripple torque or system perturbation, and on account of the selected structure of the pulse pattern generation can simply be replaced by other sets.

The exemplary embodiments described with below with reference to FIGS. 10 and 11 relate to the two aspects of the invention, according to which a plurality of switching actions are calculated in advance and are stored, or longer intervals of time between two switching actions are used for a repetition of the sampling and calculation of the switching times. These aspects are particularly well suited for pulse patterns with the control of a power converter based on instantaneous values according to specified stator flux trajectories. With the methods described below, the sampling time of the control system can be selected so that it is greater than the minimum switching time of the power converter phases. The exemplary embodiments discussed below relate to such a case.

In FIG. 10, the time axis that runs from left to right is identified by a lower-case t. Two long lines that run from top to bottom and intersect the time axis define two sampling times $t_1$ and $t_2$, which follow each other immediately, i.e. there are no additional samplings and calculations between these two instants. In a calculation cycle that is carried out before the instant $t_1$, two switching cycles (each of which consists of two switching actions per cycle) for the switching of the same phase of a power converter are calculated, and are written in corresponding registers at the instant $t_1$. The time interval between the two sampling instants which are illustrated in FIG. 10 is designated $T_{sample}$. Within this sampling interval, only a single new calculation cycle for the calculation of the switching times after the time $t_2$ can be performed. The two previously calculated switching cycles are therefore executed during the sampling interval. FIG. 10 relates to only one of the three phases. Switching cycles for the other two phases can be calculated in a corresponding manner. Using the method described above, two switching cycles starting from an ON phase can also be realized. FIG. 10 shows by way of example only one sequence, starting from an OFF phase at the beginning of the sampling time.

Each of the switching cycles is defined in FIG. 10 by a rectangular pulse interval $t_1$ whereby the time of the beginning of the rectangular pulse interval lies a length of time $T_{ON}$ after the beginning of the sampling time interval. The first switching cycle is thereby designated by the additional index k and the second switching cycle by the additional index k+1. In the exemplary embodiment, therefore, at the time $t_1$ for each of these total of four switching actions, a value which corresponds to the respective instant is entered into a register. At the instant $T_{ON(k)}$ the phase is switched, for example, from the low potential of the intermediate circuit to the high potential of the intermediate circuit. At the instant $T_{OFF(k)}$ the phase is then again switched to the low potential etc. In FIG. 10, the high potential corresponds to the higher value $P_2$ of the illustrated rectangular state curve and is a function of the time. The lower potential corresponds to the lower value $P_1$.

For the execution of the switching action, for example at the time $T_{ON(k)}$ the first valve of the series circuit of two valves is switched for the switching of the phase. The second valve of the same series circuit is then later switched, corresponding to the interlock time.

In contrast to the situation illustrated in FIG. 10, one switching cycle can also be carried out incompletely within the sampling time interval.

FIG. 11 also shows a chronological sequence for the control of a power converter. Once again, the time axis is designated t. Above the time axis, a plurality of sampling instants are each marked by a thick vertical line. A total of nine sampling instants $t_1$ to $t_9$ are illustrated. Below the time axis, the switching states of all three phases of a three-phase power converter are also shown. The phases are marked L1, L2, L3. During the illustrated period, however, only phases L1 and L2 are switched.

The instants at which switching actions occur are also marked with longer, continuous lines that run from to bottom. These four switching instants, $S_1$ to $S_4$, each coincide with one of the sampling instants $t_1$ to $t_9$, namely the sampling instants $t_1$ (switching instant $S_1$), $t_3$ (switching instant $S_2$), $t_7$ (switching instant $S_3$) and $t_9$ (switching instant $S_4$). These switching instants are therefore designated the common instants within the meaning of the above description.

In contrast to the case illustrated in FIG. 11, it can also occur that an additional switching instant lies between two common instants, as is the case, for example, in the exemplary embodiment illustrated in FIG. 10.

According to the exemplary embodiment described here, for the control of a power converter, for a time interval between two common instants, a verification is conducted to determine whether this interval of time is greater than or equal to twice the length of a minimum sampling time interval $T_{sample\_min}$. If that is the case, the next subsequent sampling instant is after the beginning of the time interval which is defined by the two common instants, set at the end of the minimum sampling time interval which begins at the beginning of the time interval of the common instants. In the case illustrated in FIG. 11, this is the case for all three time intervals shown. None of the time intervals between the common instants $S_1$ to $S_4$ is less than the minimum sampling time interval. During the first minimum time interval, a calculation cycle is performed for the calculation of future switching times that come after the next subsequent sampling instant. These first calculation cycles within the time interval between the common instants, in the case illustrated in FIG. 11, are therefore between the instants $t_1$ and $t_2$, the instants $t_3$ and $t_4$ and the instants $t_7$ and $t_8$. At the end of this first minimum sampling time interval, i.e. at the instants $t_2$, $t_4$ and $t_8$, there is a repeated sampling of the measurement signals required for a subsequent calculation cycle, and the switching points just calculated are recorded, e.g. written into the register of the Compare Capture Unit (see above), and then a new calculation cycle begins. In the case of the time intervals $S_1$ to $S_2$ and $S_3$ to $S_4$, this is the last calculation cycle, because not more than one additional minimum sampling time interval fits into the respective interval. In the case of the interval $S_2$ to $S_3$, however, three additional minimum sampling time intervals one immediately after the other fit into the interval, so that additional calculation cycles and samplings can be conducted at the end of the minimum sampling time interval. The second calculation cycle within the interval $S_2$ to $S_3$ therefore begins at the instant $t_4$, the third at the instant $t_5$. After the instant $t_6$, not more than one additional minimum sampling time interval remains until the common instant $S_3$, so that no additional calculation cycle is performed.

If after a sampling instant (in this case $t_2$, $t_6$ and $t_8$) two additional minimum sampling time intervals no longer fit into one time interval, only one additional calculation cycle is executed until the common instant $S_2$, $S_3$ or $S_4$ is reached which defines the end of the time interval. The length of the last sampling time interval is therefore generally greater than the length of the minimum time interval.

It should be noted that the case illustrated in FIG. 11 is not defined a priori at the instant $t_1$. Rather, the sequence of the individual sampling time intervals illustrated in FIG. 11 as well as the sequence of the common instants $S_1$ to $S_4$ is the result of concrete calculation cycles performed. In each calculation cycle, it is first determined which switching operations lying after the next subsequent sampling instant are executed. The entire control system of the switching times is therefore based on the sampling values obtained at the beginning of the calculation cycle.

FIG. 9 shows by way of example a signal flux diagram of one special advantageous embodiment of the reference value voltage calculation for the above mentioned control method with pulse pattern generation based on mean values and a dead-beat response of the stator flux control.

The invention teaches that the illustrated structure can be used both for asynchronous and for synchronous pulse methods based on mean values with different numbers of cycles. In the advantageous embodiment described in greater detail, only asynchronous and pulses with the numbers 15 and 9 are taken into consideration. However, the structure can also be used in an additional advantageous realization which is not explained in any further detail for cycles with low cycle numbers based on mean values (7, 5, 3× cycles including block cycles) and higher cycle numbers (e.g. 21× cycles). The advantages of the dead-beat flux control described below apply for all the timings and cycles described.

The flux diagram presented in FIG. 9 has an upper branch which receives as the input variable the product of the stator flux reference value $\Psi_{S\_ref}$ and the field weakening coefficient $\gamma$ of the control system. The scalar reference value is multiplied by the directional space vector of the stator flux space vector predicted at the end of the current period (block 91). The result of the multiplication is multiplied in block 92 by the result of another branch for thee angular difference of the stator flux indicator. By differentiation 93 with the predicted stator flux space vector, an interim result is obtained which is divided in block 94 by the duration of the next sampling cycle (next pulse period) $T_P$. The result of the division is then added by an adder 95 to the product (block 96) of the stator resistance $R_S$ and of the stator current $i_S$.

The result of the addition is divided in block 97 by the filtered intermediate circuit voltage $U_{DC\_fl}$ to get the final result, the modulation degree vector $a_{S\_ref}$. This vector and its components can be, for example, the output variables of the control system of device 4 (FIG. 2), which are transmitted to the pulse pattern generator B. The multiplication operation in block 97 (FIG. 9), however, can also be performed by the pulse pattern generator B, so that the stator voltage reference value vector $u_{S\_ref}$ to be set or its components can be the output variables of the closed-loop control system of device 4.

The lower branch of the flux diagram in the exemplary embodiment has three input variables, whereby two of the input variables can be used alternatively. In the first case, the switching elements of the illustrated blocks 101, 104, 106 are in the lower position as illustrated in FIG. 9. This case relates to asynchronous operation at the stator fundamental frequency with pulse patterns based on mean values. The input variables of the lower branch in this case are the stator frequency ωS and the reciprocal value of the pulse period $T_{p,asyn}$. From this reciprocal value, by a repeated inversion (block 102) and subsequent multiplication (block 103) with the stator frequency, the difference of the angular position is calculated for the calculation of the new stator flux indicator. This angular difference is related in block 105 to the current position of the indicator and transmitted to block 92. The reciprocal value of the pulse period $T_{p,asyn}$ is transmitted to block 94 via switching element 106.

In the second case, which corresponds to operation with a synchronous PMW, the switching elements 101, 104, 106, in contrast to the situation illustrated in FIG. 9, assume their upper switch position. In this case, the input variables are the difference of the angular positions of the stator flux indicator or, alternatively, the new specified angular position which the stator flux indicator is to assume at the end of the control cycle at the next sampling time, and in turn the stator rotation frequency. By calculating the reciprocal of the angular position difference in block 102 and subsequent multiplication with the stator rotation frequency in block 103, the reciprocal of the duration of the sampling cycle for the synchronous case is formed and transmitted via the switching element 106 to the block 94. The angular position difference is also transmitted via the switching element 104 to block 105, the result of which is transmitted to block 92.

The structure illustrated in FIG. 9 is implemented in particular in software, so that the blocks, adders, subtracters, dividers and switching elements do not have to be present in the form of hardware.

The advantages claimed by the invention of the dead-beat flux control system illustrated above will be explained on the basis of the two Gedanken experiments which are illustrated by way of example in FIGS. 7 and 8.

FIG. 7 shows the response of the stator flux space vector in a stationary coordinate system referenced to the stator with asynchronous pulses based on mean values in field weakening operation, when the intermediate circuit voltage increases suddenly. In the figure, each stator flux $\Psi_{s,k}$, $\Psi_{s,k+1}$, etc. is illustrated by an arrow running outward from the origin of the coordinate system. In all cases, this is the stator flux which is valid at the sampling instant at the beginning of a closed-loop control cycle. At the beginning of the k-th closed-loop control cycle, the stator flux is shown at an intermediate circuit voltage $U_{DC}$ of 500 V. During the sampling at the beginning of this cycle, this intermediate circuit voltage is measured. During the k-th closed-loop control cycle, the stator flux is therefore not varied in terms of its magnitude and only the rotation $\Delta\Psi_{s,k}$ of the indicator is defined by the angular difference $\Delta X_{s,k}$. In one preferred embodiment of the invention, the angular positions $X_{s,k}$ and/or angular differences $\Delta X_{s,k}$ of the stator flux space vector can be specified, e.g. as stored in a table. In this manner, it becomes easily possible to synchronize the rotation of the stator flux indicator with the fundamental frequency.

Under certain conditions, however, an exception can be made and the stator flux space vector can be set to a position that differs from the specified angular position or rotated by an angle difference different from the specified angle difference. An exception of this type is illustrated in FIG. 7 and FIG. 8.

During the k-th closed loop control cycle, the intermediate circuit voltage changes suddenly from 500 V to 692 V. At the sampling point at the beginning of the k+1-th closed loop control cycle, this intermediate circuit voltage is measured. For the closed-loop control structure that means that the field weakening coefficient γ also changes suddenly.

With a conventional P-closed-loop controller, the compensation for this deviation from the reference value to approximately zero would be completed only after a plurality of computational cycles (pulse periods). On account of the mode of operation of a P-closed loop controller, the machine would thereby be operated in the voltage operating range and not, as is customary in field weakening, with a constant, maximum modulation. That results from the fact that the change of the stator flux and thus the magnitude of the specified voltage and thus ultimately the modulation are not governed by the value at which the modulation becomes maximal, but according to the specifications of the slip and flux closed-loop controller.

Moreover, with a pulse pattern that cannot set the reduced modulation (e.g. block cycling), the stator flux necessarily runs beyond its required angular position, as a result of which there is an angular error of the stator flux space vector at the end of the k+1-th closed-loop control cycle, after which the slip frequency controller again responds. Ultimately, that results in the above mentioned loss of controllability.

The closed-loop control structure claimed by the invention, on the other hand, on account of its dead-beat response, requires a stator flux change as early as in the first closed-loop control cycle after the change (the k+1-th control cycle), and thus a reference value voltage which is greater than or equal to (optimally) the maximum possible change of the stator flux and thus of the reference value voltage. On account of this fact and the fact that the reference value voltages, before they are transmitted to the pulse pattern generation based on mean values, are limited in terms of the angle, in this case the machine is not operated in the operating voltage range, but (as is customary in field weakening) with a constant maximum modulation. The disadvantages described above of a conventional P-controller in connection with the operating voltage range are eliminated. However, as a result of the angular limitation of the reference value voltage, there is an angular error of the stator flux space vector at the end of the k+1th closed-loop control cycle. As a result of the closed-loop control structure claimed by the invention, however, this error is also corrected within a minimum number of closed-loop control cycles (in FIG. 7, in one closed-loop control cycle).

FIG. 7 shows: the indicator III of the stator flux for the hypothetical case in which the intermediate circuit voltage does not vary; the indicator I of the stator flux for the impossible case that the specified angular position with the desired stator flux amount is reached immediately and the actual position of the indicator II at the end of the k+1-th control cycle.

In the next K+2-th control cycle, the sudden change in the intermediate circuit voltage is completely corrected and the magnitude of the stator flux reaches the value which corresponds to the new intermediate circuit voltage U=692 V. The closed-loop control system remains stable because the slip frequency controller engages and keeps the torque constant. At the end of the K+2-th control cycle, it is once again possible to maintain the specified angular position of the indicator angular position or the angular difference (over two cycles).

As mentioned above, these relationships are valid for asynchronous pulse pattern operation based on mean values. For synchronous pulse pattern operation based on mean values the situation is similar, except for the fact that the above mentioned angular error of the stator flux space vector at the end of the k+1-th control cycle does not occur. That results from the fact that the pulse period is not specified as in asynchronous operation, but can be calculated all over again from the stator frequency and the angle difference $\Delta X_{s,k+1}$ of the stator flux vector diagram in the k+1-th control cycle according to the following equation for each control cycle (see also FIG. 9):

$$T_p = \frac{\Delta X_{s,k+1}}{\omega_{s\_ref}} \quad [8]$$

The absence of an additional synchronization controller thereby has three advantages. First, the complexity of the control structure is reduced. Second, no additional controller engages which might compete with the slip frequency controller for the angular position of the stator flux space vector, which would in turn lead to a destabilization of the closed-loop control, and third a very accurate synchronization with the fundamental frequency is possible, whereby exceptions occur only in the event of dynamic variations, although they are corrected again in the next control cycle.

FIG. 8 also shows the reaction of the stator flux space vector in a stationary coordinate system referenced to the stator during asynchronous pulsing based on mean values in field-weakening operation, although a sudden change in the speed of rotation of the machine from 600 to 433 rad/s takes place in the k-th control cycle.

The conditions are similar to those illustrated in FIG. 7, except that the angular positions of the stator flux space vector with and without a change in the speed of rotation of the machine (after the correction) no longer coincide with one another as they do in FIG. 7 in the event of a change of the intermediate circuit voltage.

FIG. 9, in a manner similar to FIG. 11, shows a chronological sequence of operations in the open-loop control of a power converter, but with pulse patterns based on mean values. The time axis is again designated with t. Above the time axis, a plurality of sampling points are each marked by a thick vertical line. A total of nine sampling instants $t_1$ to $t_9$ are shown. Below the time axis, the figure also shows the switching states of all three phases of the power converter. The phases are designated L1, L2 and L3.

Also shown in FIG. 13 are two pulse periods $T_{pp\_1}$, $T_{pp\_2}$ whereby the first pulse period extends from the sampling instant $t_1$ to the sampling instant $t_6$ and the second pulse period follows immediately until the sampling instant $t_9$. Over the two pulse periods, each phase is turned on once and turned off once (as shown). Alternatively, the three phases can each be first turned off and then turned on over the two pulse periods. In each case, at the beginning and at the end of the pulse periods, i.e. a zero voltage is switched at the sampling instants $t_1$, $t_6$, $t_9$.

In the exemplary embodiment described here, a minimum sampling time interval is specified which corresponds to the $T_{sample\_min}$ illustrated in FIG. 11. The current pulse period with the asynchronous or synchronous pulses based on mean values is divided into integral multiples (although there are at least three sampling intervals, each with at least $T_{sample\_min}$).

The last of the time intervals within the pulse period is used for computing tasks and operations which must bee executed directly for the calculation of the pulse patterns based on mean values (e.g. PWM pulse pattern). In the illustrated case, these are the time intervals between the sampling instants $t_5$ and $t_6$ and between $t_8$ and $t_9$. In FIG. 13, these time intervals are designated "ISC_A_PWM".

An advantage of this method is that the pulse patterns can each be calculated on the basis of the most current sampling values, in particular of the intermediate circuit voltage.

In the time interval ISC_A_CTRL that falls immediately before the time interval ISC_A_PWM computer tasks and operations are performed that are not directly for the calculation of the pulse patterns. Examples of such tasks are the calculation of the reference value voltage calculation illustrated in FIG. 9.

In the third illustrated time interval ISC_A_CTRL_WAIT, calculations are conventionally performed which do not need to be performed immediately in the penultimate and final sampling cycle, such as, for example, the prediction of the current stator flux space vector at the end of the current pulse period and calculations of the mean values over the measurements from the past pulse periods.

The invention claimed is:

1. An open-loop or closed-loop control device for the operation of an asynchronous machine which is powered by a 3-phase power converter, comprising an open-loop and/or closed-loop control structure, the control structure comprising:

a slip frequency controller with an output at which the slip frequency controller outputs a reference value of a stator frequency of the asynchronous machine, a stator flux controller and a first pulse pattern generator for the generation of pulse signals based on mean values, wherein the control structure can be used such that the first pulse pattern generator generates the pulse signals based on mean values so that switching operations of the 3-phase power converter occur in synchronization with the fundamental frequency of rotation of the stator flux space vector, the control structure can be used such that the first pulse pattern generator generates pulse signals based on mean values so that switching operations of the 3-phase power converter are asynchronous with the fundamental frequency of rotation of the stator flux space vector, one output of the stator flux controller is in communication with an input of the pulse pattern generator so that the pulse pattern generator can generate the pulse signals as a function of a manipulated variable which is generated by the stator flux controller, the stator flux controller is adapted to generate the manipulated variable as a function of a reference value of the stator flux of the asynchronous machine and as a function of a reference value of the torque of the asynchronous machine, and the stator flux controller has a dead-beat control response and the output of the slip frequency controller is in communication with an input of the stator flux controller so that the reference value of the stator frequency is used for the generation of the manipulated variable, and a second pulse pattern generator in communication with an output of a stator flux observer, such that during the operation of the asynchronous machine by means of stator flux trajectory guided synchronous pulse patterns based on instantaneous values, the pulse pattern is generated directly as a function of a reference value of the stator flux and the current value, the current value being determined by the stator flux observer, wherein the second pulse pattern generator is switched in parallel to the first pulse pattern generator, and wherein the output of the slip frequency controller is also in communication with an input of the second pulse pattern generator, such that the same slip frequency controller is used regardless of whether the device for the operation of the asynchronous machine generates the pulse pattern based on mean values.

2. The control device of claim 1, wherein to activate the power converter, the stator flux controller outputs a modulation of the asynchronous machine as the manipulated variable by means of the pulse signals based on mean values, wherein the modulation is defined by a ratio of a mean output voltage of the power converter to an input voltage of the power converter, or the stator flux controller outputs a specified voltage of the asynchronous machine as the manipulated variable.

3. The control device of claim 1, wherein the manipulated variable generated by the stator flux controller is used in the operation of the asynchronous machine in both the operating voltage range and in the field weakening range.

4. The control device of claim 1, wherein a closed-loop control system formed by the stator flux observer and the second pulse pattern generator exhibits a dead-beat control response.

5. The control device of claim 1, wherein to actuate the power converter, the slip frequency controller, together with the stator flux controller, by means of the pulse signals based on mean values, performs the function of a synchronization controller in the sense of a phase locked loop, wherein the phase locked loop synchronizes the switching of zero voltages of the power converter with the fundamental frequency of the rotation of the stator flux space vector.

6. The control device of claim 1, wherein to operate the power converter with synchronous pulses regardless of whether pulse signals based on mean values or instantaneous values are generated, the control structure, in addition to the stator flux controller and the slip frequency controller does not have a synchronization controller which synchronizes the switching of zero voltages of the power converter with the fundamental frequency of rotation of the stator flux space vector.

7. The control device of claim 6, wherein the control structure is adapted such that for the actuation of the power converter by means of the pulse signals based on mean values, in each pulse period, the manipulated variable to be output by the control structure on the basis of a specified value for the angle of the stator flux space vector is calculated by the stator flux controller, so that the next zero voltage to be switched is switched at the specified angle.

8. The control device of claim 1 wherein the power converter has a plurality of electronic valves which are turned on and off corresponding to the pulse signals generated by the pulse pattern generator, the device has an open-loop control device for the control of the power converter, and wherein:
the open-loop control device has a calculator unit for the calculation of phase switch instants,
the open-loop control device is combined with registers in each of which a data value corresponding to a phase switch instant can be written,
a comparison device is provided which is adapted to verify whether a data value that varies cyclically as time proceeds coincides with a data value in the registers, and, if so, triggers a switching action which is associated with the respective register, and
for at least one switching action, at least one additional register is provided, so that the switching action can be triggered multiple times without a repeated writing of data values into the register.

9. The control device of claim 8, wherein the calculator unit is adapted to define sampling times at which measurement signals required for the calculation of the phase switching times are to be sampled, and is adapted to calculate the phase switching times repeatedly in successive calculation cycles, and wherein the open-loop control device is adapted to write into the register the data values corresponding to the phase switching times which have been calculated in one of the calculation cycles.

10. The control device of claim 8, wherein the electronic valves are insulated gate bipolar transistors.

11. The control device of claim 1, wherein the power converter has a plurality of electronic valves which are turned on and off repeatedly for the operation of the power converter, the control structure has an open-loop control device for the control of the power converter, and wherein:
the open-loop control device has a calculator unit for the calculation of phase switching times,
the calculator unit is adapted to define sampling instants at which measurement signals required for the calculation of the phase switching instants are to be sampled,
the calculator unit is adapted to define at least some of the phase switching times and at least some of the sampling times at common instants at which one sampling instant and at least one phase switching instant coincide, and
the calculator unit is adapted to determine, in a time interval, the beginning and end of which are each defined by one of the common instants, at least one additional sampling instant if the time interval is sufficient for more than one calculation cycle for the calculation of new phase switching instants, and the calculator unit is adapted to perform the calculation cycle after the additional sampling instant on the basis of values which were sampled at the additional sampling instant.

12. The control device of claim 11, wherein the electronic valves are insulated gate bipolar transistors.

13. An open-loop and/or closed-loop control method for the operation of an asynchronous machine which is operated by a 3-phase power converter, wherein
a slip frequency controller is used which outputs a reference value of a stator frequency of the asynchronous machine,
a stator flux controller with a dead-beat control response is used for the open-loop and/or closed-loop control with the actuation of the power converter by means of pulse signals based on mean values, wherein the stator flux controller, as a function of a reference value of the stator flux of the asynchronous machine and as a function of a reference value of the torque of the asynchronous machine, outputs a manipulated variable which is used to generate the pulse signals based on mean values using a downstream first pulse pattern generator, the reference value of the stator frequency is used for the generation of the reference value, the pulse signals based on the mean values can be generated so that switching actions of the 3-phase power converter occur in synchronization with the fundamental frequency of rotation of the stator flux space vector, and the pulse signals based on mean values can be generated so that switching actions of the 3-phase power converter are asynchronous with the fundamental frequency of rotation of the stator flux space vector, and
a second pulse pattern generator is used for the open-loop and/or closed-loop control of the actuation of the power converter by means of synchronous pulse patterns based on instantaneous values, wherein the second pulse pattern generator receives the reference value of the stator frequency from the slip frequency controller, and the second pulse pattern generator is switched in parallel to the first pulse pattern generator.

14. The method of claim 13, wherein to activate the power converter by means of the pulse signals based on mean values, the stator flux controller outputs a modulation of the asynchronous machine as a manipulated variable, wherein the modulation is defined by a ratio of a mean output voltage of the power converter to an input voltage of the power converter, or the stator flux controller outputs a reference value voltage of the asynchronous machine as the manipulated variable.

15. The method of claim 13, wherein a variable controlled by the stator flux controller is used for the operation of the asynchronous machine in both the operating voltage range and in the field weakening range.

16. The method of claim 13, wherein to activate the power converter by means of the pulse signals based on mean values, the slip frequency controller, together with the stator flux controller, performs the function of a synchronization controller in the sense of a phase locked loop which synchronizes the switching of zero voltages of the power converter with the fundamental frequency of rotation of the stator flux space vector.

17. The method of claim 13, wherein for the operation of the power converter with synchronous pulses, regardless of whether pulse signals based on mean values or instantaneous values are generated, besides the stator flux controller and the slip frequency controller, no synchronization controller is used which synchronizes the switching of zero voltages of the power converter with the fundamental frequency of rotation of the stator flux space vector.

18. The method of claim 13, wherein the power converter is operated above the rated voltage point in the field weakening range, without any operating voltage reserve, and wherein a pulse pattern change is possible at any time.

19. The method of claim 13, wherein a value of the angle of the stator flux space vector is transmitted as an input variable to the stator flux controller, and wherein the stator flux controller calculates a manipulated variable which is to be output by the stator flux controller so that the next zero angle to be switched is switched at the angle.

20. The method of claim 13, wherein
phase switching instants are calculated at which the switching actions with reference to one phase of the power converter are to be executed,
one data value corresponding to each phase switching instant is written in a register,
a verification is conducted, whether a data value that varies cyclically as the time progresses coincides with a data value in the registers and, if so, a switching action associated with the respective register is triggered, and
for at least one switching action, more than one phase switching instant is calculated in advance and is written in the register, so that the switching action can be triggered multiple times without a repeated writing of data values into the register.

21. The method of claim 20, wherein sampling instants are specified at which measurement signals required for the calculation of the phase switching times are to be sampled, wherein the phase switching instants are repeatedly calculated in successive calculation systems, and wherein the phase switching instants which have been calculated in one of the calculation cycles are written into the register at the next successive sampling instant.

22. The method of claim 21, wherein at the next successive sampling time, new data values are written into all the registers which can be checked to trigger switching actions.

23. The method of claim 20, wherein for all six possible switching actions, more than one phase switching instant is calculated in advance and is written in the register, so that the switching action can be triggered multiple times without a repeated writing of data values into the register.

24. The method of claim 13, wherein:
phase switching instants are calculated,
sampling instants are determined at which the measurement signals required for the calculation of the phase switching instants are to be sampled,
at least some of the phase switching instants and at least some of the sampling instants are defined at common instants, at which a sampling instant and at least one phase switching instant coincide, and
in a time interval, the beginning and end of which are each defined by one of the common instants, at least one additional sampling instant is determined if the time interval is sufficient for more than one calculation cycle for the calculation of new phase switching instants, and after the additional sampling instant, the calculation cycle is performed on the basis of values that were sampled at the additional sampling instant.

25. The method of claim 13, wherein for a change from a first pulse pattern to a second pulse pattern, a verification is performed to determine in which of the two pulse patterns the power converter has a lower maximum possible modulation, wherein,
if the power converter has a lower maximum possible modulation in the first pulse pattern, without changing the modulation, the change to the second pulse pattern is executed and the power converter is operated in the field weakening range at least temporarily after the change, and
if the power converter has a lower maximum possible modulation in the second pulse pattern, the modulation, if necessary, is reduced so that it falls under the maximum possible modulation in operation with the second pulse pattern, and the change to the second pulse pattern is then executed.

26. A computer readable medium having stored thereon instructions which, when executed by a processor, cause the processor to perform the method of claim 13.

* * * * *